US008385590B1

(12) United States Patent  
Moorer

(10) Patent No.: US 8,385,590 B1  
(45) Date of Patent: Feb. 26, 2013

(54) VIDEO WATERMARKING WITH TEMPORAL PATTERNS

(75) Inventor: James A. Moorer, Panacea, FL (US)

(73) Assignee: Adobe Systems Incorporated, San Jose, CA (US)

( * ) Notice: Subject to any disclaimer, the term of this patent is extended or adjusted under 35 U.S.C. 154(b) by 1148 days.

(21) Appl. No.: 12/265,507

(22) Filed: Nov. 5, 2008

(51) Int. Cl.
*G06K 9/00* (2006.01)

(52) U.S. Cl. ....................................... 382/100
(58) Field of Classification Search .................... 382/100
See application file for complete search history.

(56) References Cited

U.S. PATENT DOCUMENTS

| | | |
|---|---|---|
| 5,170,440 A | 12/1992 | Cox |
| 5,359,362 A | 10/1994 | Lewis et al. |
| 5,363,305 A | 11/1994 | Cox et al. |
| 5,383,013 A | 1/1995 | Cox |
| 5,644,651 A | 7/1997 | Cox et al. |
| 5,696,964 A | 12/1997 | Cox et al. |
| 5,727,080 A | 3/1998 | Cox et al. |
| 5,734,592 A | 3/1998 | Cox et al. |
| 5,751,838 A | 5/1998 | Cox et al. |
| 5,774,576 A | 6/1998 | Cox |
| 5,848,155 A | 12/1998 | Cox |
| 5,915,027 A | 6/1999 | Cox et al. |
| 5,930,369 A | 7/1999 | Cox et al. |
| 5,991,426 A * | 11/1999 | Cox et al. ..................... 382/100 |
| 6,069,914 A | 5/2000 | Cox |
| 6,078,688 A | 6/2000 | Cox et al. |
| 6,108,434 A | 8/2000 | Cox et al. |
| 6,154,571 A | 11/2000 | Cox et al. |
| 6,208,735 B1 | 3/2001 | Cox et al. |
| 6,278,792 B1 | 8/2001 | Cox et al. |
| 6,282,300 B1 | 8/2001 | Bloom et al. |
| 6,332,194 B1 | 12/2001 | Bloom et al. |
| 6,724,911 B1 | 4/2004 | Cox et al. |
| 6,738,493 B1 | 5/2004 | Cox et al. |
| 6,795,565 B2 * | 9/2004 | Wendt .......................... 382/100 |
| 6,996,249 B2 | 2/2006 | Miller et al. |
| 7,058,223 B2 | 6/2006 | Cox |
| 7,058,697 B2 | 6/2006 | Rhoads |
| 7,197,164 B2 * | 3/2007 | Levy ............................. 382/100 |
| 7,593,543 B1 | 9/2009 | Herz et al. |
| 7,636,451 B2 * | 12/2009 | Isogai .......................... 382/100 |
| 2007/0276670 A1 | 11/2007 | Pearlstein |
| 2008/0250240 A1 * | 10/2008 | Celik et al. .................... 713/155 |
| 2009/0002480 A1 * | 1/2009 | Cutler ........................ 348/14.08 |

(Continued)

OTHER PUBLICATIONS

Ahumada Jr., et al., "Computational Image Quality Metrics: A Review," 1-5 (1993).

(Continued)

*Primary Examiner* — Bhavesh Mehta  
*Assistant Examiner* — Utpal Shah  
(74) *Attorney, Agent, or Firm* — Fish & Richardson P.C.

(57) ABSTRACT

In general, one aspect of the subject matter described in this specification can be embodied in a system that includes a user interface device; and one or more computers operable to interact with the user interface device and to perform operations including: receiving video data including frames; varying a watermark pattern in accordance with a function of frame numbers of the frames of the video data to create multiple variations of the watermark pattern; applying the variations of the watermark pattern to the video data in respective frames; and outputting the watermarked video data. Other embodiments of this aspect include corresponding methods, apparatus, and computer program products, as well as corresponding receiver and watermark detection system, methods, apparatus, and computer program products.

23 Claims, 15 Drawing Sheets

U.S. PATENT DOCUMENTS

2009/0220070 A1      9/2009   Picard et al.
2010/0322463 A1* 12/2010   Celik ........................... 382/100

OTHER PUBLICATIONS

Akansu et al., "Guest Editorial Special Issue on Signal Processing for Data Hiding in Digital Media and Secure Content Delivery," *IEEE Transactions on Signal Processing*, 51(4):897 (2003).

Alattar et al., "Digital Watermarking of Low Bit-Rate Advanced Simple Profile MPEG-4 Compressed Video," *IEEE Transactions on Circuits and Systems for Video Technology*, 13(8):787-800 (2003).

Alattar and Meyer, "Watermark Re-Synchronization Using Log-Polar Mapping of Image Autocorrelation," 4 pages (2003).

Barni, "What Is the Future for Watermarking? (Part I)," *IEEE Signal Processing Magazine*, 56-60 (2003).

Barni, "What Is the Future for Watermarking? (Part II)," *IEEE Signal Processing Magazine*, 53-57 (2003).

Bassia et al., "Robust Audio Watermarking in the Time Domain," *IEEE Transactions on Multimedia*, 3(2):232-241 (2001).

Buchsbaum, "An Analytical Derivation of Visual Nonlinearity," *IEEE Transactions on Biomedical Engineering*, 27(5):237-242 (1980).

Buchsbaum, "The Retina as a Two-Dimensional Detector Array in the Context of Color Vision Theories and Signal Detection Theory," *Proceedings of the IEEE*, 69(7):772-786 (1981).

Busch, "Digital Watermarking: From Concepts to Real-Time Video Applications," *IEEE Computer Graphics and Applications*, 25-35 (1999).

Cayre et al., "Watermarking Security: Theory and Practice," *IEEE Transactions on Signal Processing*, 53(10):3976-3987 (2005).

Cheng and Huang, "Robust Optimum Detection of Transform Domain Multiplicative Watermarks," *IEEE Transactions on Signal Processing*, 51(4):906-924 (2003).

Cohen et al., "Biorthogonal Bases of Compactly Supported Wavelets," *Communications on Pure and Applied Mathematics*, XLV:485-560 (1992).

Cox et al., "Secure Spread Spectrum Watermarking for Images, Audio and Video," *Proc. IEEE*, 243-246 (1996).

Cox et al., "Secure Spread Spectrum Watermarking for Multimedia," *IEEE Transactions on Image Processing*, 6(12):1673-1687 (1997).

Cox and Linnartz, "Some General Methods for Tampering with Watermarks," *IEEE Journal on Selected Areas in Communications*, 16(4):587-593 (1998).

Cox and Miller, A review of watermarking and the importance of perceptual modeling,, *SPIE*, (316):96-99 (1997).

Cox and Miller, "Electronic Watermarking: The First 50 Years," *IEEE*, 225-230 (2001).

Cox et al., "Digital Watermarking. Chapter 2: Applications and Properties," *Academic Press*, 11-40 (2002).

Cox et al., "Watermarking applications and their properties," 5 pages (2003).

Cox et al., "Watermarking as Communications with Side Information," *Proceedings of the IEEE*, 87(7):1127-1141 (1999).

Daly, "A Visual Model for Optimizing the Design of Image Processing Algorithms," *IEEE*, 16-20 (1994).

de Vleeschouwer et al., "Invisibility and Application Functionalities in Perceptual Watermarking—An Overview," *Proceedings of the IEEE*, 90(1):64-77 (2002).

Delaigle et al., "A Psychovisual Approach for Digital Picture Watermarking," 29 pages (at least as early as Aug. 28, 2008).

Delaigle et al., "Human Visual System Features Enabling Watermarking," *IEEE*, 489-492 (2002).

Digimarc Patent Portfolio [online] [retrieved on Jul. 18, 2008]. Retrieved from the Internet: https://www.digimarc.com/tech/patent_list.asp.

Fei et al., "The Choice of Watermark Domain in the Presence of Compression," *IEEE*, 79-84 (2001).

Ganjam and Zhang, "Internet Multicast Video Delivery," *Proceedings of the IEEE*, 93(1):159-170 (2006).

Hartung et al., "Multimedia Watermarking Techniques," *Proceedings of the IEEE*, 87(7):1079-1107 (1999).

Herley, "Why Watermarking Is Nonsense," *IEEE Signal Processing Magazine*, 10-11 (2002).

Jayant et al., "Signal Compression Based on Models of Human Perception," *Proceedings of the IEEE*, 81(10):1385-1422 (1993).

Kalker et al., "Music2Share—Copyright-Compliant Music Sharing in P2P Systems," *Proceedings of the IEEE*, 92(6):961-970 (2004).

Klein et al., "Seven models of masking," *SPIE*, 3016:13-24 (1997).

Kundur and Hatzinakos, "Digital Watermarking Using Multiresolution Wavelet Decomposition," *IEEE*, 2969-2972 (1998).

Kundur and Hatzinakos, "Digital Watermarking for Telltale Tamper Proofing and Authentication," *Proceedings of the IEEE*, 87(7):1167-1180 (1999).

Kundur and Karthik, "Video Fingerprinting and Encryption Principles for Digital Rights Management," *Proceedings of the IEEE*, 92(6): 918-932 (2004).

Kutter, "Performance Improvement of Spread Spectrum Based Image Watermarking Schemes Through M-ary Modulation," published in *Lecture Notes in Computer Science*, 16 pages (1999).

Kutter, "Digital Image Watermarking: Hiding Information in Images," 11 pages (1999).

Kutter et al., "Towards Second Generation Watermarking Schemes," 4 pages (1999).

Lin et al., "Advances in Digital Video Content Protection," *Proceedings of the IEEE*, 93(1):171-183 (2005).

Lin et al., "Rotation, Scale, and Translation Resilient Watermarking for Images," *IEEE Transactions on Image Processing*, 10(5):767-782 (2001).

Lin et al., "Image Authentication Based on Distributed Source Coding," 4 pages (2007).

Lin et al., "Image Authentication and Tampering Localization using Distributed Source Coding," 4 pages (2007).

Lin et al., "Spatial Models for Localization of Image Tampering Using Distributed Source Codes," (4 pages) (2007).

Macq et al., "Benchmarking of Image Watermarking Algorithms for Digital Rights Management," *Proceedings of the IEEE*, 92(6):971-984 (2004).

Malvar and Florêncio, "Improved Spread Spectrum: A New Modulation Technique for Robust Watermarking," *IEEE Transactions on Signal Processing*, 51(4):898-905 (2003).

Miller et al., "Dirty-Paper Trellis Codes for Watermarking," *IEEE*, II-129-132 (2002).

Miller et al., "Watermarking in the Real World: An Application to DVD," *IEEE*, 1496-1502 (1999).

Miller et al., "Applying Informed Coding and Embedding to Design a Robust High-Capacity Watermark," *IEEE Transactions on Image Processing*, 13(6):792-807 (2004).

Moulin, "Comments on "Why Watermarking is Nonsense"," *IEEE Signal Processing Magazine*, 57-59 (2003).

Moulin and Koetter, "Data-Hiding Codes," *Proceedings of the IEEE*, 93(12):2083-2126 (2005).

Nikolaidis and Pitas, "Region-Based Image Watermarking," *IEEE Transactions on Image Processing*, 10(11):1726-1740 (2001).

Podilchuk and Zeng, "Digital image watermarking using visual models," *SPIE*, 3016:100-111 (1997).

Resnikoff et al., "Biorthogonal Wavelet Space: Parametrization and Factorization," submitted to *SIAM Journal on Mathematical Analysis*, 21 pages (1999).

Slepian and Wolf, "Noiseless Coding of Correlated Information Sources," *IEEE Transactions on Information Theory*, IT-19(4):471-480 (1973).

Smith, "Perception of temporal continuity in discontinuous moving images," 1 page (2004).

Su et al., "A Content-Dependent Spatially Localized Video Watermark for Resistance to Collusion and Interpolation Attacks," *IEEE*, 818-821 (2001).

Swanson et al., "Transparent Robust Image Watermarking," *IEEE*, 211-214 (1996).

Tang and Hang, "A Feature-Based Robust Digital Image Watermarking Scheme," *IEEE Transactions on Signal Processing*, 51(4):950-959 (2003).

Varodayan et al. "Audio Authentication Based on Distributed Source Coding," 4 pages (2008).

Voloshynovskiy et al., "A Stochastic Approach to Content Adaptive Digital Image Watermarking," printed by *Digital Copyright Technologies*, Switzerland, 19 pages (at least as early as Aug. 28, 2008).

Voloshynovskiy et al., "A Stochastic Approach to Content Adaptive Digital Image Watermarking," 26 pages (1999).

Voyatzis et al., "Digital Watermarking: An Overview," 4 pages (19998).

Watson et al., "Image quality and entropy masking," *SPIE*, 3016:1-12 (1997).

Wolfgang and Podilchuk, "Perceptual Watermarks for Digital Images and Video," *Proceedings of the IEEE*, 87(7):1108-1126 (1999).

Wu et al., "A Rotation, Scale and Translation Resilient Public Watermark," *IEEE*, 2065 (1999).

Zhao and Koch, "A Digital Watermarking System for Multimedia Copyright Protection," *ACM Multimedia*, 443-444 (1996).

Zhao and Koch, "Embedding Robust Labels into Images for Copyright Protection," *In: Proc. of the Int. Congress on Intellectual Property Rights for Specialized Information, Knowledge and New Technologies*, Vienna, 10 pages (1995).

USPTO, Non-Final Office Action mailed Apr. 13, 2012, U.S. Appl. No. 12/202,071, 10 pages, to be published by USPTO.

Hunter, Response to Non-Final Office Action filed Jan. 30, 2012, U.S. Appl. No. 12/202,071, 12 pages, to be published by USPTO.

USPTO, Non-Final Office Action mailed Nov. 9, 2011, U.S. Appl. No. 12/202,071, 11 pages, to be published by USPTO.

Hunter, Response to Non-Final Office Action filed Jul. 12, 2012, U.S. Appl. No. 12/202,071, 11 pages, to be published by USPTO.

\* cited by examiner

VIDEO WATERMARKING WITH TEMPORAL PATTERNS

BACKGROUND

The present disclosure relates to applying and detecting electronic watermarks in video data.

Electronic watermarking involves the embedding of an imperceptible or difficult to perceive signal into a work. Common types of works include images, graphics, pictures, video, and audio. Works can then be analyzed later to determine if a watermark is present within that particular work. Watermarking schemes typically balance a number of competing factors. It is generally desirable to make a watermark as imperceptible to human detection as possible so that it does not draw the attention of the audience of the work. This goal is often at odds with the ability to detect watermarks accurately, because imperceptible watermarks are generally less differentiated from the original work. Some watermarks are designed to be robust against manipulations that the associated work can undergo, such as compression, cropping, or distortion. Other watermarks are designed to be less robust in the process of making such watermarks less perceptible.

SUMMARY

This specification describes technologies relating to applying and detecting electronic watermarks in video data.

In general, one aspect of the subject matter described in this specification can be embodied in a system that includes a user interface device; and one or more computers operable to interact with the user interface device and to perform operations including: receiving video data including frames; varying a watermark pattern in accordance with a function of frame numbers of the frames of the video data to create multiple variations of the watermark pattern; applying the variations of the watermark pattern to the video data in respective frames; and outputting the watermark video data. Other embodiments of this aspect include corresponding methods, apparatus, and computer program products.

These and other embodiments can optionally include one or more of the following features. The outputting can include storing the watermarked video data to a tangible medium for subsequent detection of the watermark pattern (e.g., saving to a local disk or transmitting to a remote repository). The varying can include varying the watermark pattern in accordance with a square wave function. The square wave function can have a first amplitude corresponding to even numbered frames and a second amplitude corresponding to odd numbered frames. The varying can include producing each variation of the watermark pattern from a gain factor and a perceptual weighting applied to the watermark pattern, with the gain factor being governed by the function. The varying can include varying the watermark pattern in accordance with a multipart function having a first part used for a first set of frames and a second part used for a second set of frames, where the operations further include selecting which of the first and second function parts to use for a given set of frames based on an analysis of video data within the given set of frames. Moreover, the one or more computers can include a client computing system, including the user interface device, and a server computing system operable to interact with the client computing system through a data communication network.

Another aspect of the subject matter described in this specification can be embodied in a system that includes a user interface device; and one or more computers operable to interact with the user interface device and to perform operations including: receiving video data including multiple frames; combining video data from different frames to create combined data in which a watermark pattern is enhanced, the watermark pattern being represented in the video data by multiple variations of the watermark pattern, the variations of the watermark pattern having been varied in accordance with a function of frame numbers of the frames; analyzing the combined data to detect the watermark pattern; and outputting an indication of a match, to trigger further processing with respect to the video data, when the analyzing indicates the watermark pattern has been detected. Other embodiments of this aspect include corresponding methods, apparatus, and computer program products.

These and other embodiments can optionally include one or more of the following features. The combining can include subtracting video data found in one of the frames from video data found in another one of the frames. The watermark pattern can include a two dimensional watermark pattern, and the subtracting can include subtracting each of multiple video frames from that frame's adjacent frame. The variations of the watermark pattern can be varied in accordance with a sinusoidal function including a temporal frequency, and the combining can include multiplying video data found in the frames by sine and cosine of the temporal frequency. The watermark pattern can include a one dimensional watermark pattern, where each of the variations of the watermark pattern has been applied to multiple one dimensional data lines in at least one of the frames, and the combining can include adding the multiple one dimensional data lines together for each of the variations of the watermark pattern to create respective one dimensional arrays of numbers, and subtracting one of the arrays from another of the arrays. Moreover, the one or more computers can include a client computing system, including the user interface device, and a server computing system operable to interact with the client computing system through a data communication network.

Particular embodiments of the subject matter described in this specification can be implemented to realize one or more of the following advantages. Inter-frame processing can be used in video watermarking application and detection to enhance the detectability of a watermark. A time-varying gain, which is independent of the video content, can be applied in order to help cancel out correlation between the watermark pattern and the image itself during the watermark recovery procedure. The signal to noise ratio for the watermark detection can be enhanced by using inter-frame processing techniques that tend to cancel out the image data while enhancing the watermark data.

Applying a temporal pattern can change the distribution between different frequency energies in the image being analyzed to reduce the energy of the residual or noise (the image energy that is not part of the watermark). Common visual elements among the frames of the video data can be significantly attenuated, thus enhancing the ability to detect the watermark. For example, a positive gain can be applied to the watermark for even-numbered frames, and an equal but negative gain can be applied to the watermark for odd-numbered frames; then, to recover the watermark, adjacent frames can be subtracted. Other temporal patterns can be employed as well, and such patterns can result in a watermark that is detectable at much lower levels than have been previously reported.

If there is strong frame-to-frame correlation, differencing can greatly attenuate the parts of the image that are common to the two frames, such as the background of the video image. Differencing adjacent frames can generally reduce the total energy, leaving the watermark in the data in a more detectable form. This can allow the watermark to be added to the image at greatly reduced gain, which is consequently less visible. This can assist in creating a watermarking technique that gets much closer to achieving the mutually antagonistic goals of high detectability and low visibility. In addition, temporal patterning, such as frame differencing, can be used with other watermarking techniques, including one dimensional watermark patterning techniques, and can be employed in many different systems for many different purposes.

For example, detection of a watermark by a video playback device can provide support to robust rights management schemes, the association of metadata with the video, or the aggregation of viewer demographic data. Watermark detection can be added to a video playback chain using a technique that need not require a large memory footprint and can satisfy strict processing time requirements in a media player. Fast detection of watermarks can result in cost effective filtering of a large amount of video content. The monitoring of broadcast videos can result in the assurance that paid content such as commercial advertisements are being broadcast. Computationally efficient detection of watermarks can result in the implementation of watermark detection on electronic devices with limited computational ability or battery power, such as mobile computing and phone devices. The size of the watermark pattern can be relatively small, since it is one dimensional. Thus, systems employing these techniques can readily search for multiple different watermarks, which can be fully known and recorded before detection begins since storage of small watermarks can be accomplished with minimal memory requirements.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
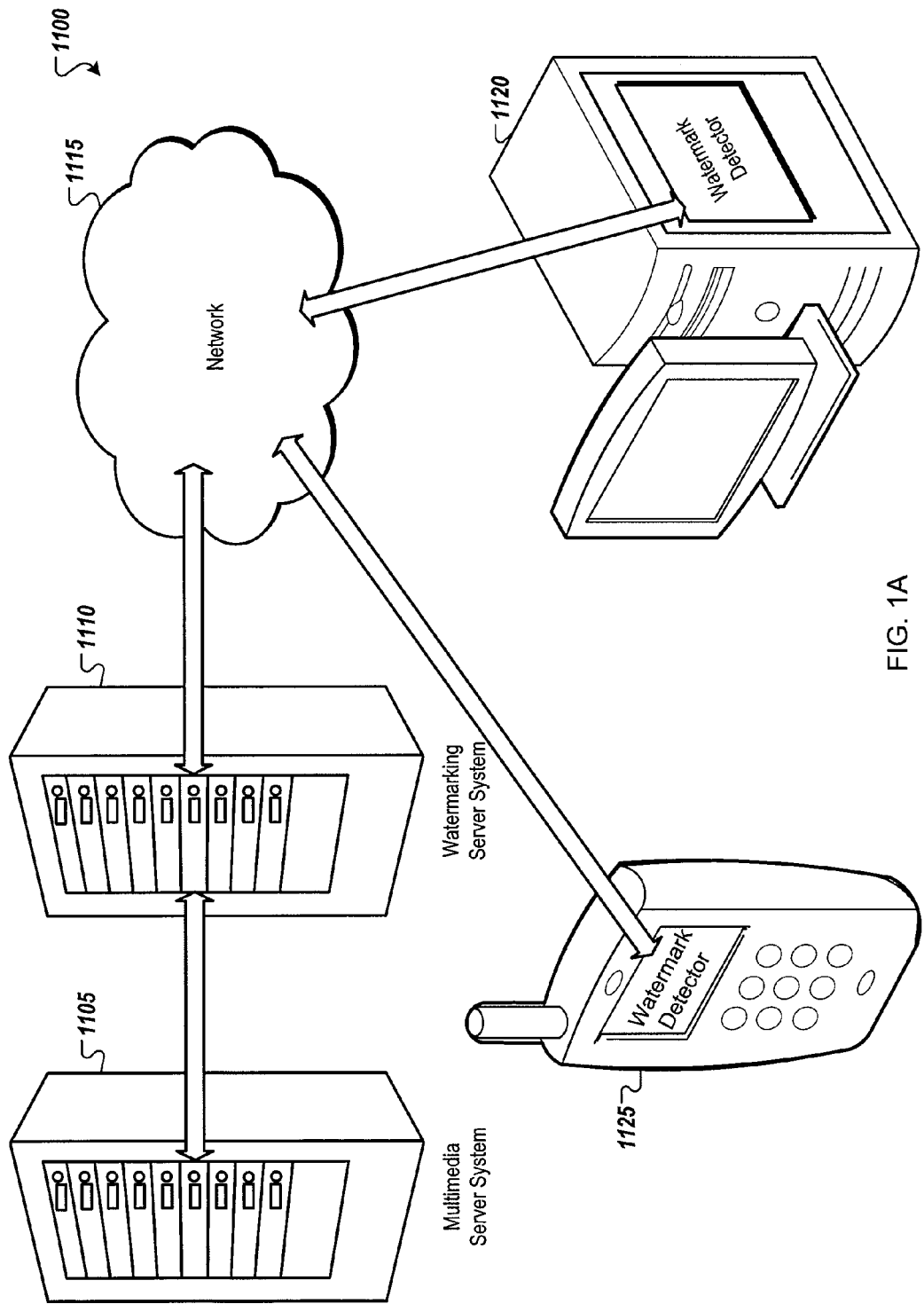
FIG. 1A is a block diagram showing an example system employing video watermarking.

FIG. 1A is a block diagram showing an example system (1100) employing video watermarking. An organization can utilize a video distribution and monitoring system (1100) to distribute a watermarked video and collect viewership information related to the video. The distribution system (1100) can include a multimedia server system (1105) and a watermarking server system (1110). The watermarking server system (1110) can utilize a shared network (1115) such as the Internet to communicate with remote clients (1120 and 1125). Other configurations of the distribution system (1100) are possible, including fewer and/or more of each individual element.

In some implementations, the multimedia server system (1100) can contain a library of multimedia files including, but not limited to, video files for public distribution. The multimedia server system (1105) can communicate with the watermarking server system (1110). The watermarking server system (1110) can receive video files from the multimedia server system (1105) and can embed a watermark into the video file. In some implementations, the multimedia server system (1105) and the watermark server system (1110) can be the same system (e.g., a single server farm or a single server machine).

The watermark server system (1110) can communicate with remote clients over the shared network (1115). In some implementations, the shared network (1115) can include the Internet, cellular telephone networks, and/or broadcast, cable, or satellite TV networks. In addition, the shared network (1115) can include non-electronic components, such as the United States Postal Service, through which videos, e.g., on Digital Versatile Discs (DVDs), can be distributed.

The remote clients (1120 and 1125) can be a desktop computer (1120) and a mobile phone (1125). Other remote clients (1120 and 1125) can also include a television, or personal music player capable of displaying video. The remote clients (1120 and 1125) can obtain (e.g., request and receive) videos from the watermarking server system (1110) or from other sources. When such videos are played, the remote clients (1120 and 1125) can verify that a watermark is in the video, and then engage in further processing based the discovery of the watermark. This can involve reporting the discovery of the watermark to the watermarking server system (1110), which can record statistics regarding the videos that are being displayed.

In addition, the remote clients (1120 and 1125) can incorporate watermarks into videos that are created on the respective computers, and communicate information regarding such watermarks back to the watermarking server system (1110). Thus, the watermarking server system (1110) can also record statistics regarding the playing of videos that are created using individual computers throughout the video distribution and monitoring system (1100).

Figure 1B:
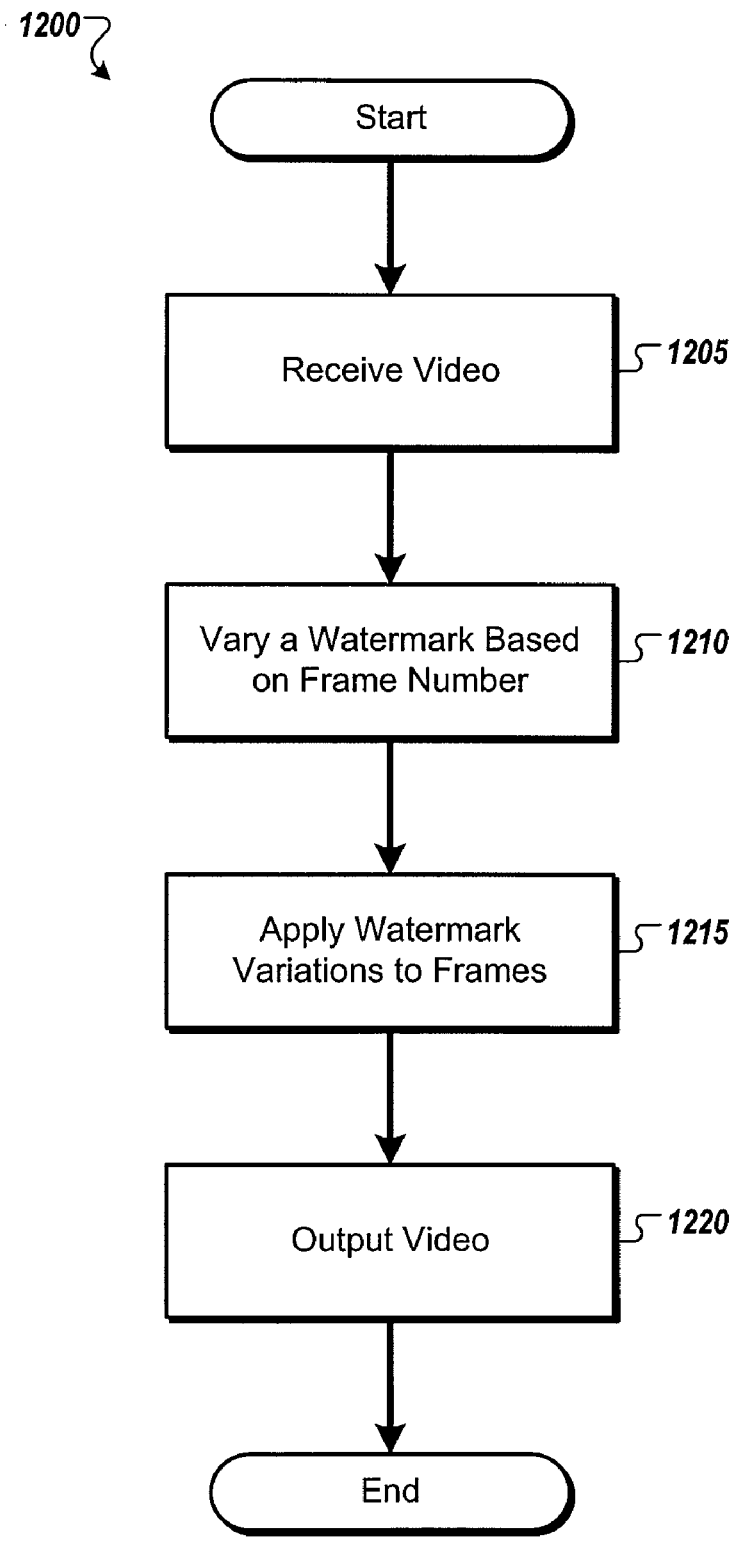
FIG. 1B is a flow chart showing an example process of adding a watermark to video data.

FIG. 1B is a flow chart showing an example process (1200) of adding a watermark to video data. In some implementations, video data can be received (1205) by a computer that can embed watermarks. In addition to receiving the video data, the process (1200) can also involve displaying the video data, adding the video data to a video library, and/or preparing the video data for distribution. A watermark pattern can be varied (1210) based on a function of frame number or timing of the video data. Note that the reference herein to functions of frame numbers does not mean that a given such function must have a frame number as an explicit input, but rather means that the function used provides a different variation of the watermark pattern for each of multiple frames in a given group of frames of video data. In some implementations, these variations can be related to a wave function and can have a known mathematical upper and lower bound, regardless of how many frames there are. For example, the variations can be related to a square wave function in which even numbered frames can have a first amplitude and odd numbered frames can have a second amplitude. In other examples, variations of the watermark pattern can be related to sinusoidal waves.

Other possibilities include the use of a known (pre-arranged) pseudo-random number (PRN) sequence, or any of a number of maximal-length sequences, such as quadratic residues, such as long binary or trinary (−1, 0, +1) sequences that are generated from shift registers or various kinds of polynomial arithmetic. These can generally be described as "number theoretic" sequences, and may have some advantages in that they are generally unique and unlikely to occur randomly. For a number-theoretic sequence, the sequence to be used can be determined and set beforehand. It would thus be difficult to discover the sequence after the fact, but one might nonetheless employ different such sequences (e.g., three different sequences) at different times.

Another possibility is to synchronize the watermark gain with the video encoding sequence. For instance, in MPEG (Moving Picture Experts Group) video, sequences of images are organized into GOPs ("Group of Pictures"). The watermark gain can thus be based on the GOPs, such as by setting the watermark gain in one GOP to +1, and setting all the watermark gains in the next GOP to −1. Thus, in general, the watermark gain can be modified to take into account the exact sequencing of encoding structures or can otherwise be synchronized with video encoding sequencing. This may provide additional advantages in various video encoding schemes, such as MPEG, where frames are added together, and thus, watermarks with opposite signs on alternating frames cancel out. When all of one GOP is encoded with one sign, then the MPEG encoding shouldn't interfere with the watermarks in that GOP; and when the next GOP is encoded with the opposite sign, the averages across each GOP can be differenced to detect the watermark, which may provide additional advantages in a watermarking system.

In any event, the watermark pattern variations can be applied (1215) to frames in the video data, and the video data can be output (1220). Once the video data has been watermarked, it can be utilized in a watermark detection system. For example, watermarked video data can be placed in a public directory, on a video streaming website, or shared in a peer to peer network.

Figure 1C:
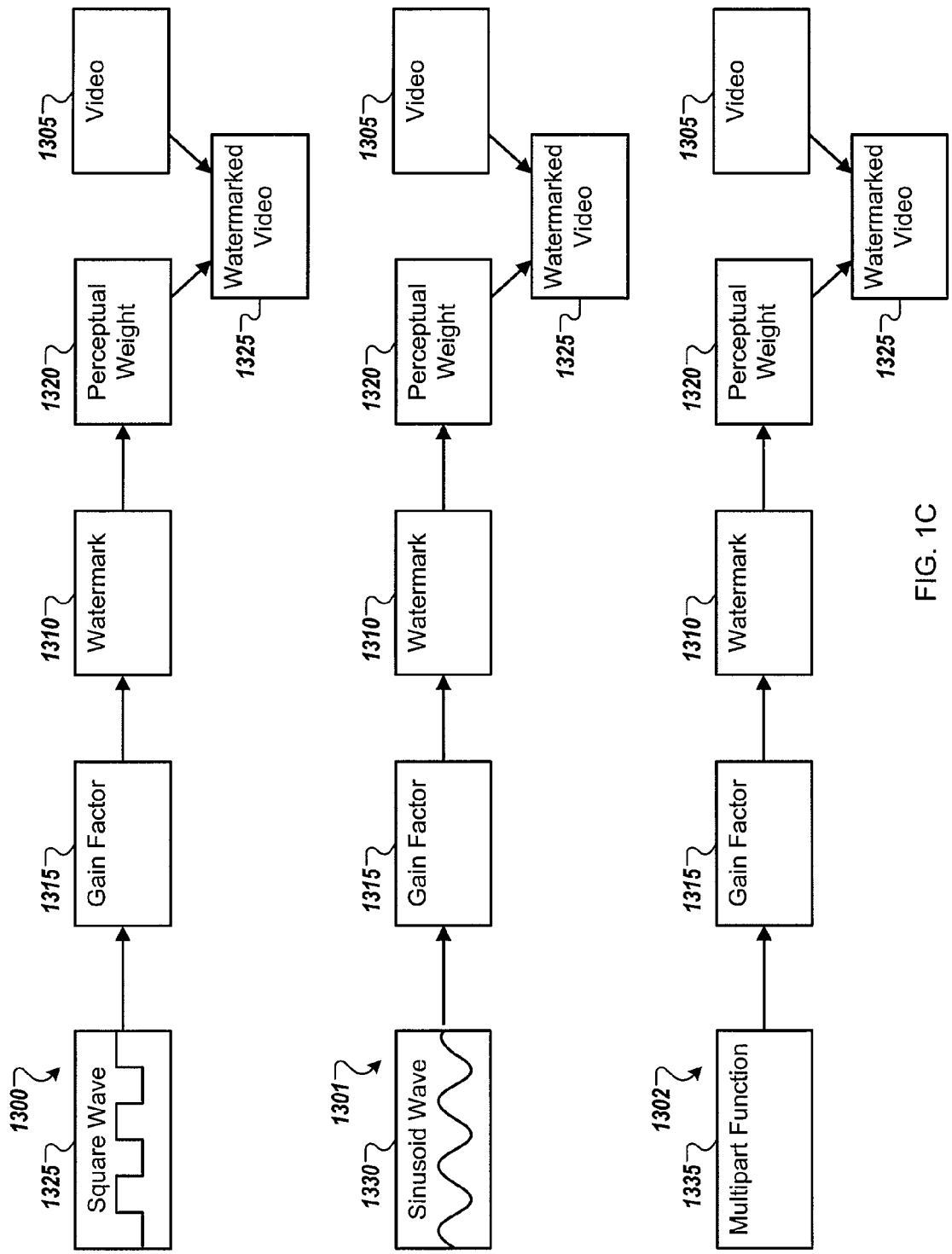
FIG. 1C is a block diagram showing various example processes of adding one or more watermarks to video data.

FIG. 1C is a block diagram showing various example processes (1300, 1301 and 1302) of adding one or more watermarks to video data. Video data (1305) can have a watermark (1310) applied to create watermarked video data (1325). The watermark (1310) can be modified by a perceptual weight (1320) and a gain factor (1315) during the creation of the watermarked video data (1325).

In some implementations, the watermark (1310) can be altered based on the video data frame to which it is being applied. For example, the watermark (1310) can be modified by the result of a square wave function (1325) which can use the frame number or timing as a parameter. In another example, the watermark (1310) can be modified by the result of a sinusoid wave function (1330) in which the frame number or timing is used as a parameter. In some implementations, a multipart function (1335) can be used to alter the watermark (1310). The multipart function (1335) can include multiple functions of the same and/or different type. The multipart function (1335) can include different functions to be applied to different portions of the video data (1305) and/or under different conditions based on analysis of the video data (1305). For example, the different parts of the multipart function (1335) can be applied to different portions of the video data (1305) based on the video data content.

The video data (1305) can show the inside of a dark room, then cut to a well lit landscape. The video data (1305) can then cut to a close up of a person's face. In this example, it can be determined that for the video data of the dark room, it is appropriate to modify the watermark (1310) with a first function in which the frame number or timing is used as a parameter. For the video data of the bright landscape, it can be determined that it is appropriate to modify the watermark (1310) with a second function in which the frame number or timing is used as a parameter. For the video data of the close up, it can be determined that it is appropriate to modify the watermark (1310) with a third function in which the frame number or timing is used as a parameter.

Moreover, the multipart function (1335) can include a function that is not a function of frame number or timing of the video data (e.g., a constant with respect to the temporal progression of frames). For example, the video data can be analyzed to determine how much motion or variation is present. Then, for a first set of frames, where there is significant variation in the image data (e.g., the video image is bouncing around a lot), the watermark pattern can be added with a positive gain that isn't affected by frame number in the first set, and for a second set of frames, where there is insignificant variation in the image data (e.g., the image is almost exactly the same from frame to frame), the watermark pattern can be added with alternating positive and negative gain in accordance with frame number in the second set. On the detection side, a similar analysis of the video data can be performed to determine which type of watermark pattern to look for (alternating or non-alternating), or the decoder can (without analysis) look for both versions of the watermark pattern by both adding sequential frames (to identify the non-alternating watermark pattern) and subtracting adjacent frames in sequence (to identify the alternating watermark patter) to see if the watermark is detected in either case. Furthermore, it should be noted that other image features can be used to flip the sign of the watermark, such as a scene cut, or a flash on the screen.

Figure 1D:
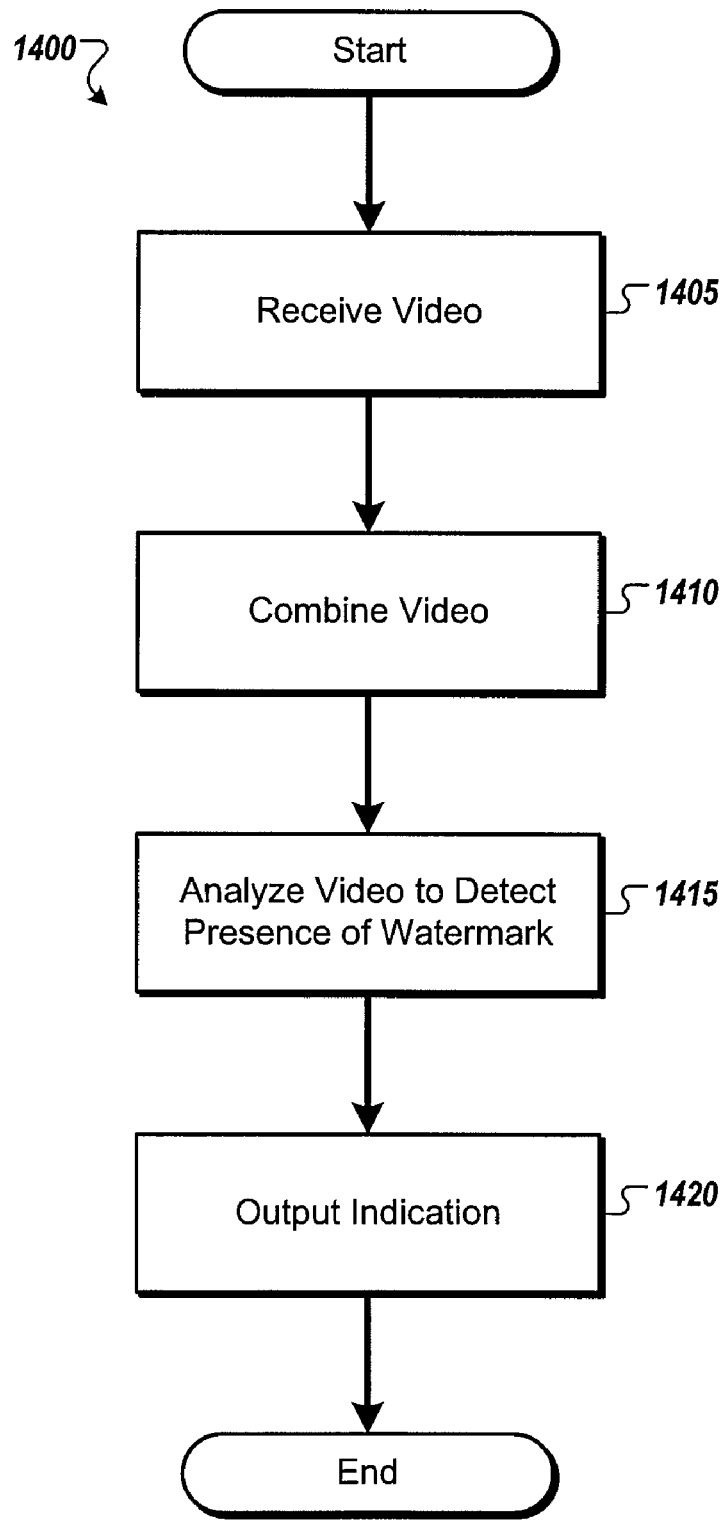
FIG. 1D is a flow chart showing an example process of detecting a watermark in video data.

FIG. 1D is a flow chart showing an example process (1400) of detecting a watermark in video data. In some implementations, video data can be received (1405) by a computer that can detect watermarks. In addition to receiving the video data, the process (1400) can also involve displaying the video data, adding the video data to a video library, and testing the video data to ensure that a watermark was correctly applied.

Portions of the video data can be combined (1410) and analyzed (1415) to detect the presence of a watermark. The combining (1410) can include generating a weighted sum of the video data from multiple frames to create an image for analysis. In some implementations, combining the video data can include the subtraction of one frame from another frame. For example, a two dimensional watermark can be embedded in video data with alternating positive and negative amplitudes, and the subtraction of one frame from an adjacent frame can result in enhanced recovery of the watermark pattern.

In some implementations, a video can have a watermark embedded wherein the watermark pattern can be varied by a sinusoidal wave function in which the frame number is used as a parameter of the sinusoidal wave function. For example, the watermark pattern can be weighted across the frames with a sinusoidal number that goes between plus one and minus one over multiple frames (e.g., ten frames). To detect the watermark, the video data in the frames can be multiplied by sine and/or cosine of the sinusoidal wave function's temporal frequency (both sine and cosine being used when the exact phase of the data is unknown). This process will tend to eliminate anything else that is happening in the video data at different temporal frequencies. Thus, for example, if the temporal frequency corresponds to a full cycle over ten frames, anything that doesn't correlate over ten frames will tend to cancel out.

Most of the time in video, each frame of video is very similar to the frame before it or the frame after it. When a frame is subtracted from the frame before it or the frame after it, most of the time they largely cancel out and the remaining residual is quite small. This means that if you put a WM in this frame with, say, a positive sign and into the next frame with a negative sign, most of the time you can subtract these two frames and cancel out most of the image, leaving just the WM itself.

Sometimes, however, there is a lot of difference between one frame and the next. In this case, subtracting one frame from an adjacent frame doesn't produce small numbers. When this happens, better results can be obtained by using the same sign for the watermark over a longer sequence, and the frames in the longer sequence can be averaged to recover the watermark. Thus, in general, alternating signs of the watermark has much higher payoff when the images are changing slowly. One strategy, then, at the time the watermark is applied, is to try from a "basket" of a few different sequences that are known beforehand (e.g., all positive, every other frame negative, five positive followed by five negative, one GOP positive followed by one GOP negative) and choose the sequence that yields the highest signal-to-noise ratio for recovering the watermark. At decode time, all the different sequences can be tried, and if one of them gives a positive result, then the watermark has been detected.

In some implementations, the embedded watermark can be a one dimensional watermark that is varied, each of the variations applied to one dimensional lines of one or more frames (such as described further below in connection with FIGS. 2A-5). The combining (1410) can include adding multiple one dimensional lines for each variation together to create a one dimensional array, and subtracting one of the arrays from another. In some of the implementations discussed above, video content objects that change position in adjacent frames can introduce some noise into the combined frames' signal, but using the enhanced watermarking techniques described can result in improved watermark detection in spite of such noise. Moreover, as noted above, in some implementations the motion of video content objects within the video data can be taken into account in the watermarking technique itself.

The analyzing (1415) can include the use of a matched filter, which can be reduced to a cross-correlation between the output image of the combining (1410) and the original watermark pattern itself. Note that the watermark pattern can be broken up into a sync mark portion and a payload portion as well. When the value of the correlation (positive or negative) exceeds a predetermined threshold level (positive or negative), the watermark has been detected. More sophisticated decision methods can be used as well. For instance, machine-learning can be used to train a Gaussian-mixture decision surface to allow decisions that are more complex than thresholding. Moreover, results from multiple sets of frames can be combined to form a multidimensional decision surface.

In any case, when the watermark is detected, an indication of the presence of a watermark can be output (1420). In some implementations, this output can include an indication for further processing of the video data. For example, metadata or statistical information can be collected, special functionality of the video player can be enabled or disabled, and/or a log file can be updated.

Figure 1E:
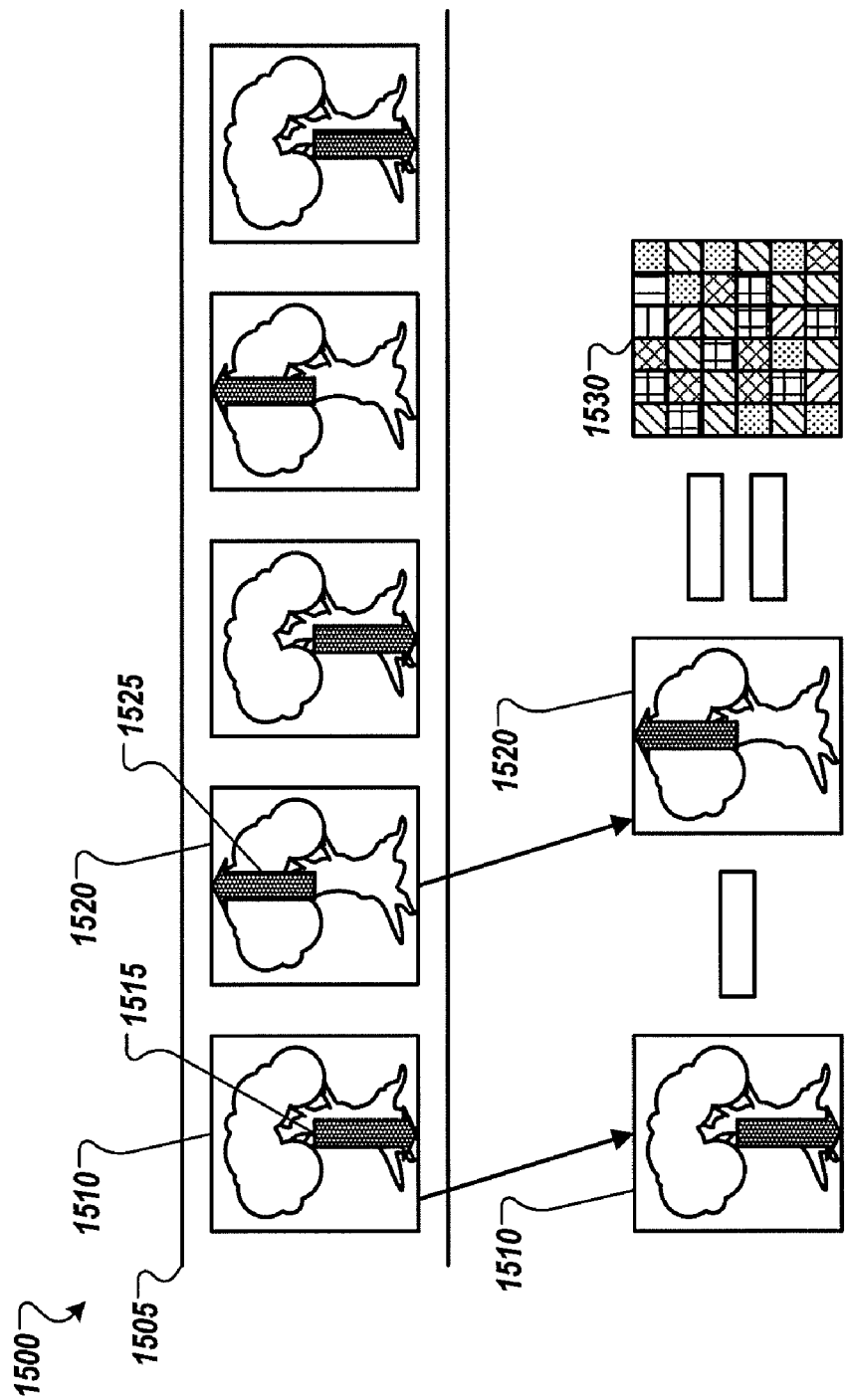
FIG. 1E is a block diagram showing another example process of detecting a watermark in video data.

FIG. 1E is a block diagram showing another example process (1500) of detecting a watermark in video data. Video data (1505) can contain frames (1510 and 1520) and can have a watermark (1530), or variations thereof, embedded in the video data (1505). In some implementations, the odd number frame (1510) can contain a variation of the watermark (1530) that is modified by a negative gain (1515). The even number frame (1520) can contain a variation of the watermark (1530) that is modified by a positive gain (1525).

The frames (1510 and 1520) can be combined to detect the watermark (1530). In one example, combining the frames (1510 and 1520) can involve subtracting the information associated with the even number frame (1520) from the odd number frame (1510). This subtraction can include subtracting a frame containing a watermark with a positive gain (1525) from a frame containing a watermark with a negative gain (1515), which can result in the detection of the watermark (1530).

Figure 2A:
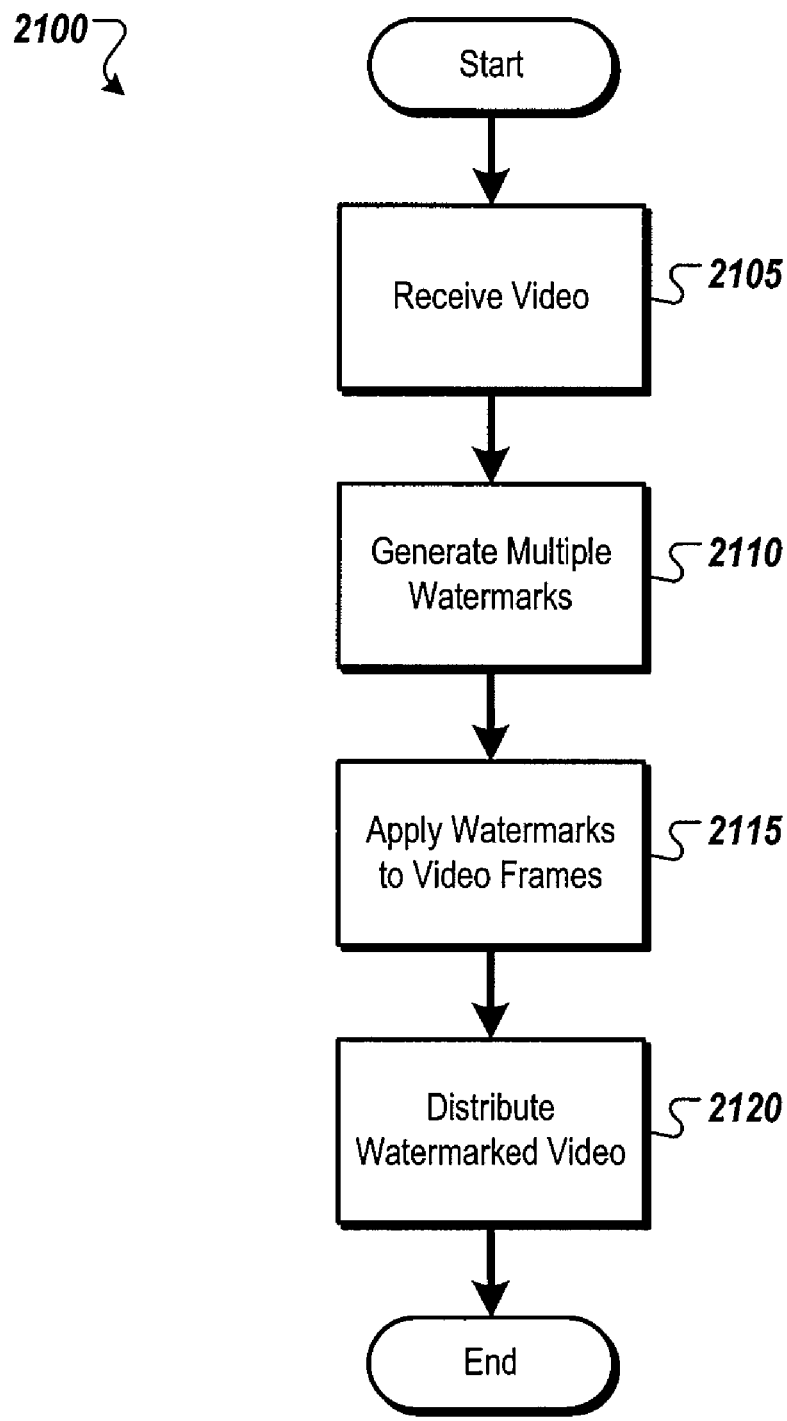
FIG. 2A is a flow chart showing an example process of adding a watermark to video data.

In addition, temporal patterning, such as described above, can be used with other watermarking techniques, including one dimensional watermark patterning techniques, and can be employed in many different systems for many different purposes. Details of such further techniques are described below in connection with FIGS. 2A-5. FIG. 2A is a flow chart showing an example process (2100) of adding a watermark to video data. A video can be received (2105) by a computer that can embed watermarks in video data. Receiving (2105) a video can involve the creation of a video, the addition of a video to a video library, and/or preparing to release copies of a video.

Multiple watermarks can be generated (2110). In some implantations, these watermarks can be created based in part or in whole on the video data received. In some implementations, additional data can be encoded into these watermarks. For example, a bit stream can be encoded in changes in amplitude or frequency between different sinusoid watermarks. In some implementations, a number (comparable to a barcode) can be encoded into one or more watermarks. In other implementations, only a single bit of information need be encoded into a watermark, where the single bit simply indicates that the video at hand has been watermarked by a given system.

One or more watermarks can be applied (2115) to one or more video frames. One watermark can be applied to each frame to be watermarked. The same watermark can be applied to more than one frame. More than one watermark can be applied to the same frame. All frames can have one or more watermarks applied, or some frames can have no watermark applied.

For example, for an image of size R×C, a watermark pattern of C numbers can be used to form the base pattern, which can be duplicated on all R rows, typically after some modification. The base pattern can be weighted with an "invisibility function" that seeks to find places in the image being watermarked where the eye is less sensitive to the presence of the watermark. The watermark can be added with high amplitude in the places where it is calculated that the eye will be less sensitive, and can be added with low amplitude in places where the eye is more sensitive. Note that there are many known techniques relating to how to form such an invisibility function from an image.

Once the video has been watermarked, the video can then be distributed (2120). In some implementations, video distribution can include the sale of a video or rights to publicly show the video. In some implementations, video distribution can include uploading of a video to an Internet web page for public viewing. In some implementations, video distribution can include the renting of the video for private viewing.

Figure 2B:
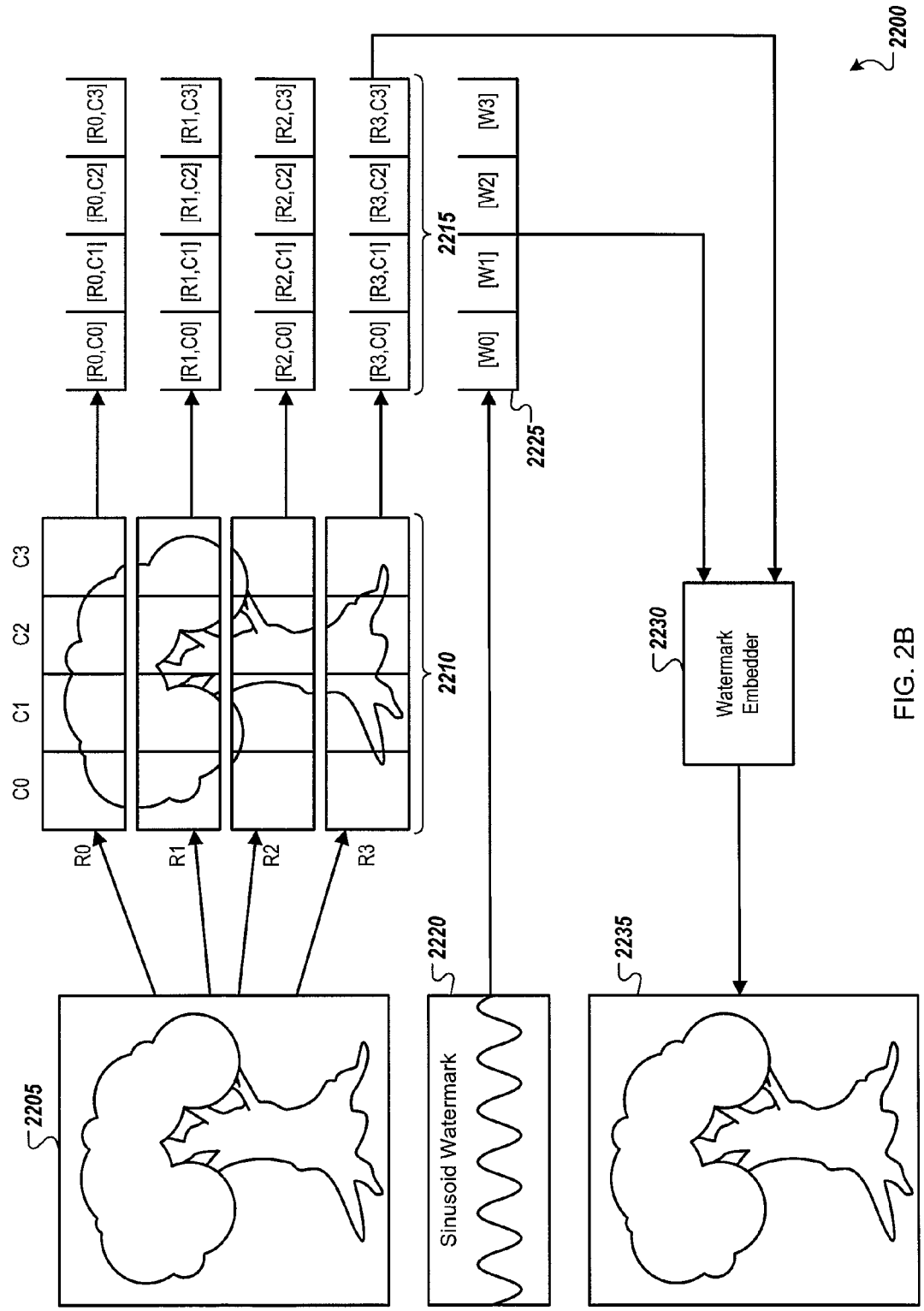
FIG. 2B is a block diagram showing another example process of adding a watermark to video data.

FIG. 2B is a block diagram showing an example process (2200) of adding a sinusoid watermark (2220) to a frame (2205) of a video. In some implementations, the frame (2205) can be separated into one or more scan lines (2210) corresponding to rows of data (R0, R1, R2, R3) in the image, which can be divided into columns (C0, C1, C2, C3). It should be noted that the scan lines (2210) are a stylized image and the size of the row-column blocks relative to the video image in the frame (2205) in the figure are for illustrations purposes only. The row and column blocks here represent the basic elements of the frame (2205), such as pixels.

The scan lines (2210) can be treated as a two dimensional array (2215). A base pattern of C numbers can be created in light of various considerations, such as minimizing visibility, maximizing robustness to transcoding, and so on. For example, a number of simple sinusoids can be chosen as base patterns. Such sinusoids can vary in frequency from twelve to eighteen cycles across the image, which can improve the ability of the watermarks to survive transcoding processes unaffected (e.g., without being swamped by large, blank areas of the image, such as blue sky, or being completely eliminated by the transcoding process itself). Note that such sinusoid watermarks can have improved survivability with respect to typical video compression techniques, such as MPEG (Moving Pictures Experts Group) compression since use of sinusoid watermarks can concentrate the energy in one frequency bin, which can force the compression algorithm to allocate bits to that particular bin, thereby causing the watermark to survive compression better than some other watermarks can. Moreover, other frequencies are also possible, both in the present sinusoid examples, and other example watermarks. For example, the frequencies employed can run from ninety to one hundred and thirty cycles.

In some implementations, each base pattern can consist of only one sinusoid at a time, and these sinusoids can be made orthogonal, since that can eliminate any interference between different patterns. Thus, some implementations can employ fourteen different base patterns, at frequencies 12, 13, . . . 18, plus the arithmetic negative of these, which are also detectable patterns. For implementations that provide increased allowance for cropping or uncertainty in the width of the image, the number of patterns employed can be limited to just three or even two patterns, such as 12, 15, and 18 cycles, or even just 12 and 18 cycles because close spatial frequencies can be confused. For implementations that tolerate extremes of cropping, the number can be limited to just one frequency and either detect its presence (or that of its negative) or absence. For implementations that minimize visibility of a watermark, 90 to 130 cycles can be employed. Thus this technique can be tailored to a range of target systems depending on the exact level of robustness required by taking a tradeoff between the number of patterns and the robustness.

The sinusoid watermark (2220) can be created and converted to a one dimensional array (2225) of weighted values (W0, W1, W2, W3). A watermark embedder (2230) can embed the one dimensional array (2225) into each row of the two dimensional array (2215). The watermark embedder (2230) can output a frame (2235) of video with the sinusoid watermark (2220) embedded.

Figure 2C:
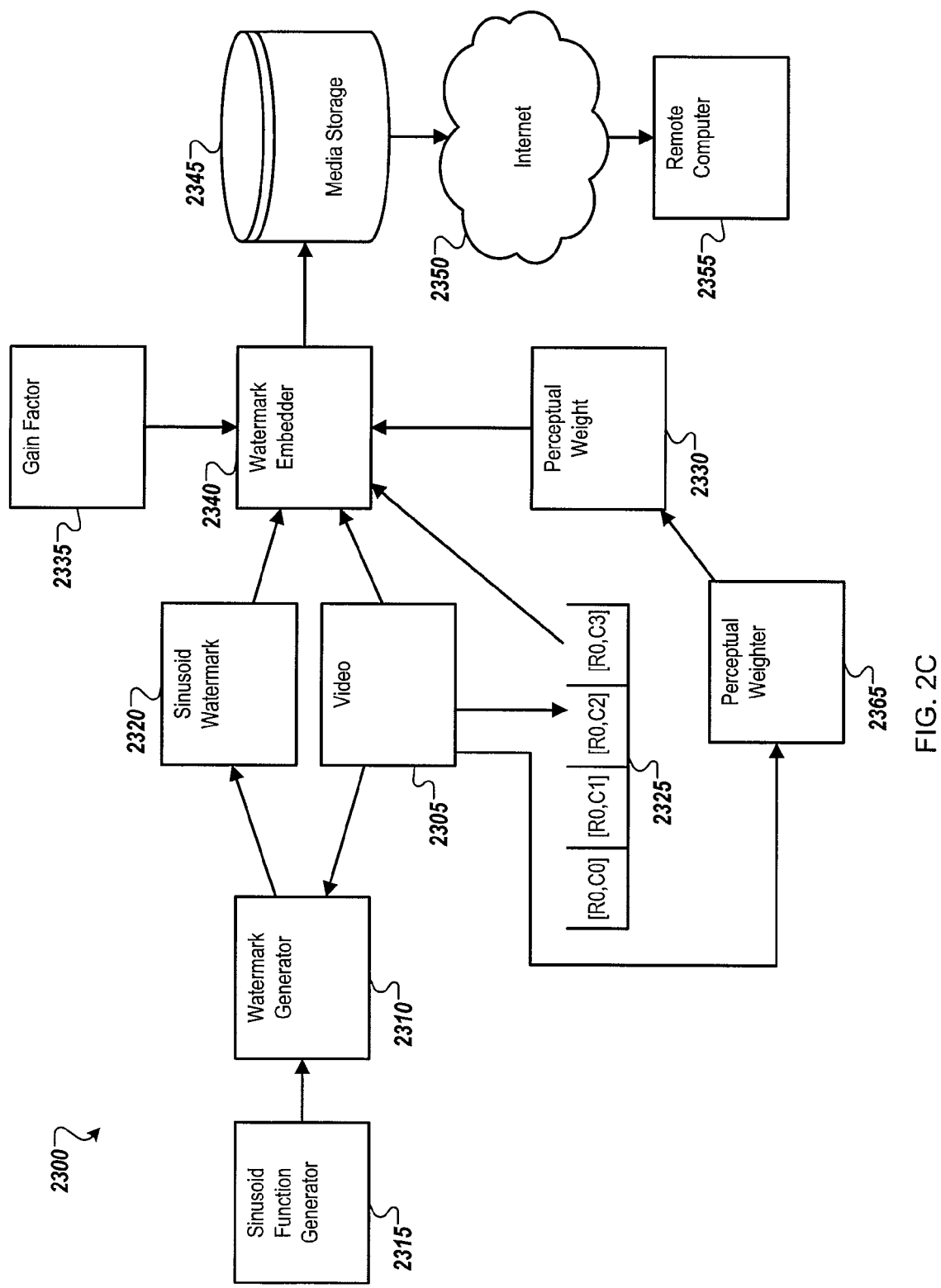
FIG. 2C is a block diagram showing an example video distribution system used to distribute a watermarked video.

FIG. 2C is a block diagram showing an example video distribution system (2300) used to distribute a watermarked video (2305). The video (2305) can be examined by a watermark generator (2310). The watermark generator (2310) can create a sinusoid watermark (2320) using a sinusoid function generator (2315) and the video (2305) data. In some implementations, the number of cycles in the sinusoid watermark (2320) can be optimized for the expected use of the watermark. In some implementations, the sinusoid watermark (2320) can include a number of cycles ranging from twelve to eighteen. In some implementations, the sinusoid watermark (2320) can include only a single cycle.

A watermark embedder (2340) can embed the sinusoid watermark (2320) into each scan line (2325) of the video (2305). The watermark embedder (2340) can use a gain factor (2335) and a perceptual weight (2330) to calculate a one dimensional data pattern for each scan line (2325). The perceptual weight (2330) can be calculated at each pixel in each scan line (2325) by a perceptual weighter (2365), which can take each video (2305) frame as input and produce perceptual weights (2330) as output that are in turn factored into the watermark (2320) before it is added to that frame's image. Thus, for an image I(R,C), the watermarked image I'(R,C) can be given by $I(R,C)+G \cdot P(C) \cdot W(R,C)$, where G is the gain factor (2335), P is the base watermark pattern, and W is the perceptual weight (2330), which can be computed from a model of the human visual system. Some models suggest that human vision does not see blue light very well, thus W(R,C) can be determined based on the amount of blue in a pixel. Moreover, more of the watermark can be embedded into the blue channel, as opposed to the red or green channels. Some models also suggest that more information can be hidden in areas of higher spatial frequencies than in lower spatial frequencies, and thus higher frequencies can be selected as well.

The video (2305) can be stored in a media storage (2345). The Internet (2350) can provide a remote computer (2355) with access to the media storage (2345). In some implementations, some or all of the components in the system (2300) can be computer software components such as programs, daemons, services, or data files. In some implementations, some or all of the components in the system (2300) can be computer hardware components such as hard disks, network cables, applications-specific integrated circuits or general purpose microprocessors. Moreover, the components in the system (2300) need not be separated as shown; for example, the sinusoid function generator (2315) can be integrated into the watermark generator (2310).

Figure 2D:
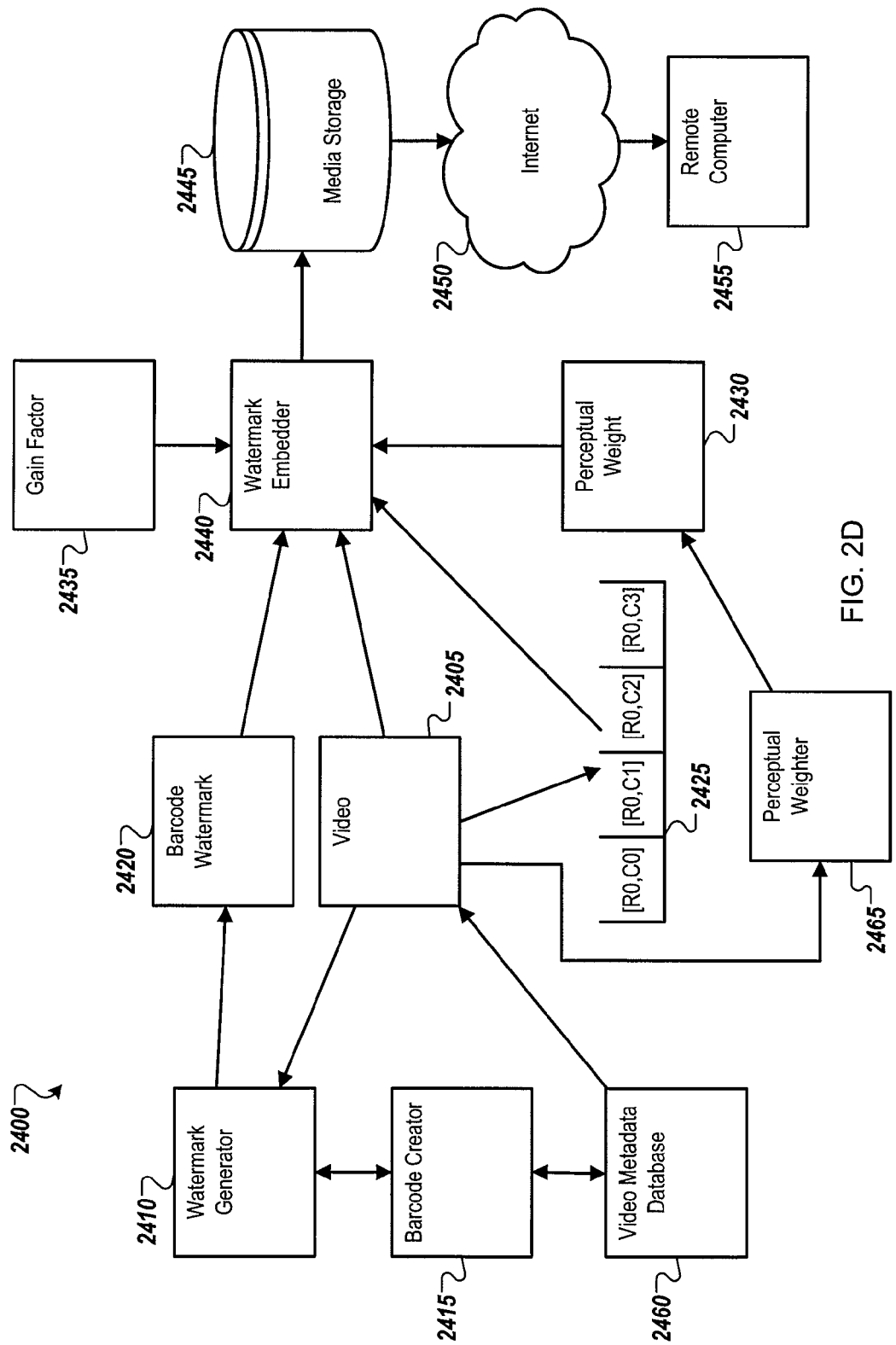
FIG. 2D is a block diagram showing another example video distribution system used to distribute a watermarked video.

FIG. 2D is a block diagram showing an example video distribution system (2400) used to distribute a watermarked video (2405) that has associated metadata. In some implementations, the video (2405) can be requested. The video (2405) can have associated metadata stored in a video metadata database (2460). A watermark generator (2410) can create a barcode-type watermark (2420) using a barcode creator (2415). The barcode creator (2415) can associate the barcode-type watermark (2420) with an entry in the video metadata database (2460), and the metadata can be related to the video (2405).

A watermark embedder (2440) can embed the barcode-type watermark (2420) into each scan line (2425) of the video (2405). The watermark embedder (2440) can use a gain factor (2435) and a perceptual weight (2430) to calculate a one dimensional data pattern for each scan line (2425). The perceptual weight (2430) can be calculated at each pixel in each scan line (2425) by a perceptual weighter (2365), such as described above.

The video (2405) can be stored in a media storage (2445). The Internet (2450) can provide a remote computer (2455) access to the media storage (2445). In some implementations, some or all of the components in the system (2400) can be computer software components such as programs, daemons, services, or data files. In some implementations, some or all of the components in the system (2400) can be computer hardware components such as hard disks, network cables, application-specific integrated circuits or general purpose microprocessors. Moreover, the components in the system (2400) need not be separated as shown; for example, the barcode creator (2415) can be integrated into the watermark generator (2410).

Figure 3A:
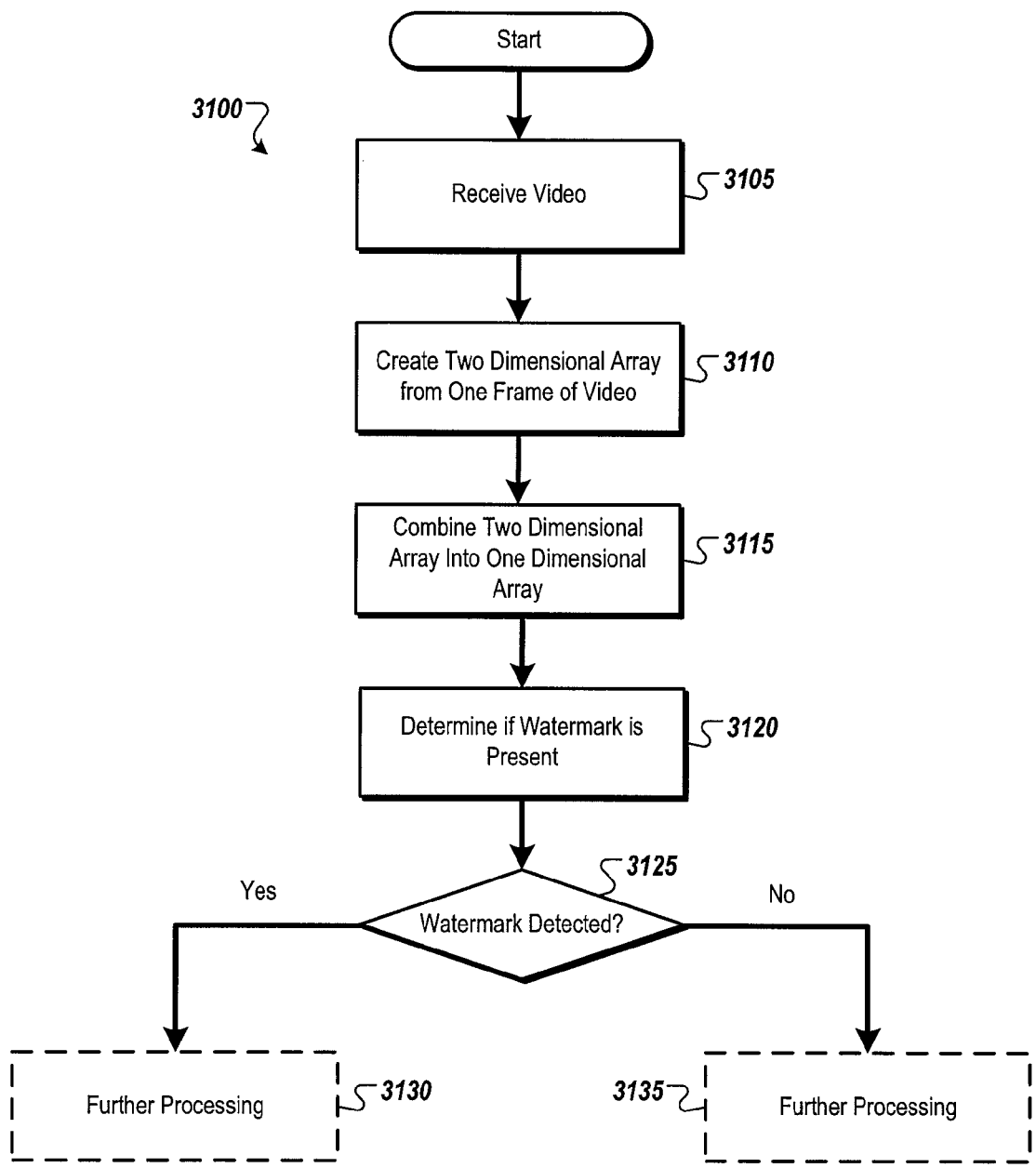
FIG. 3A is a flow chart showing an example process of detecting a watermark in video data.

FIG. 3A is a flow chart showing an example process (3100) of detecting a watermark in video data. In some implementations, a video can be received (3105) by a computer that can detect watermarks. In some implementations, in addition to receiving the video, the process (3100) can also involve displaying the video, adding the video to a video library, and testing the video to ensure that a watermark was correctly applied.

A two dimensional array can be created (3110) from a frame of the video. In some implementations, this two dimensional array can contain the pixel value with the location of the pixel corresponding to the location of the pixel value. In some implementations, this two dimensional array can contain information related to brightness, tone, or other information from the video received.

Data in the two dimensional array can be combined (3115) into a one dimensional array. In some implementations, this combining can involve calculating the sum or average of values in a row or column, as well as other operations, such as shifting (e.g., shift the pattern by one column on each successive scan line). In some implementations, this combining can involve multiple groups of random or periodic samples from the two dimensional array. In some implementations, this combining can involve the aggregation of multiple collections of data from the two dimensional array. Moreover, sums along diagonals can be used as well.

A determination (3120) can be made of the watermark's presence or absence. In some implementations, this can include a distinct positive or negative determination. In some implementations, this can include a confidence rating indicating how likely or unlikely it has been determined that a watermark is present or absent. If a watermark is detected (3125), further processing (3130) can be performed on the video. In some implementations, this processing can include collecting metadata related to the video, updating a viewership database, and/or video editing.

If a watermark was not detected (3125), further processing (3135) can be performed on the video, or not performed, depending on the implementation. It will be appreciated that in some implementations, further processing (3130) of a video found to have a watermark can be partially the same as further processing (3135) of a video found not to have a watermark. In some implementations, both sets of processing (3130 and 3135) operations can relate to viewership or ratings collection, matching metadata to a video, parental control schemes, displaying advertising information and/or machine control of a device that can display the video.

Figure 3B:
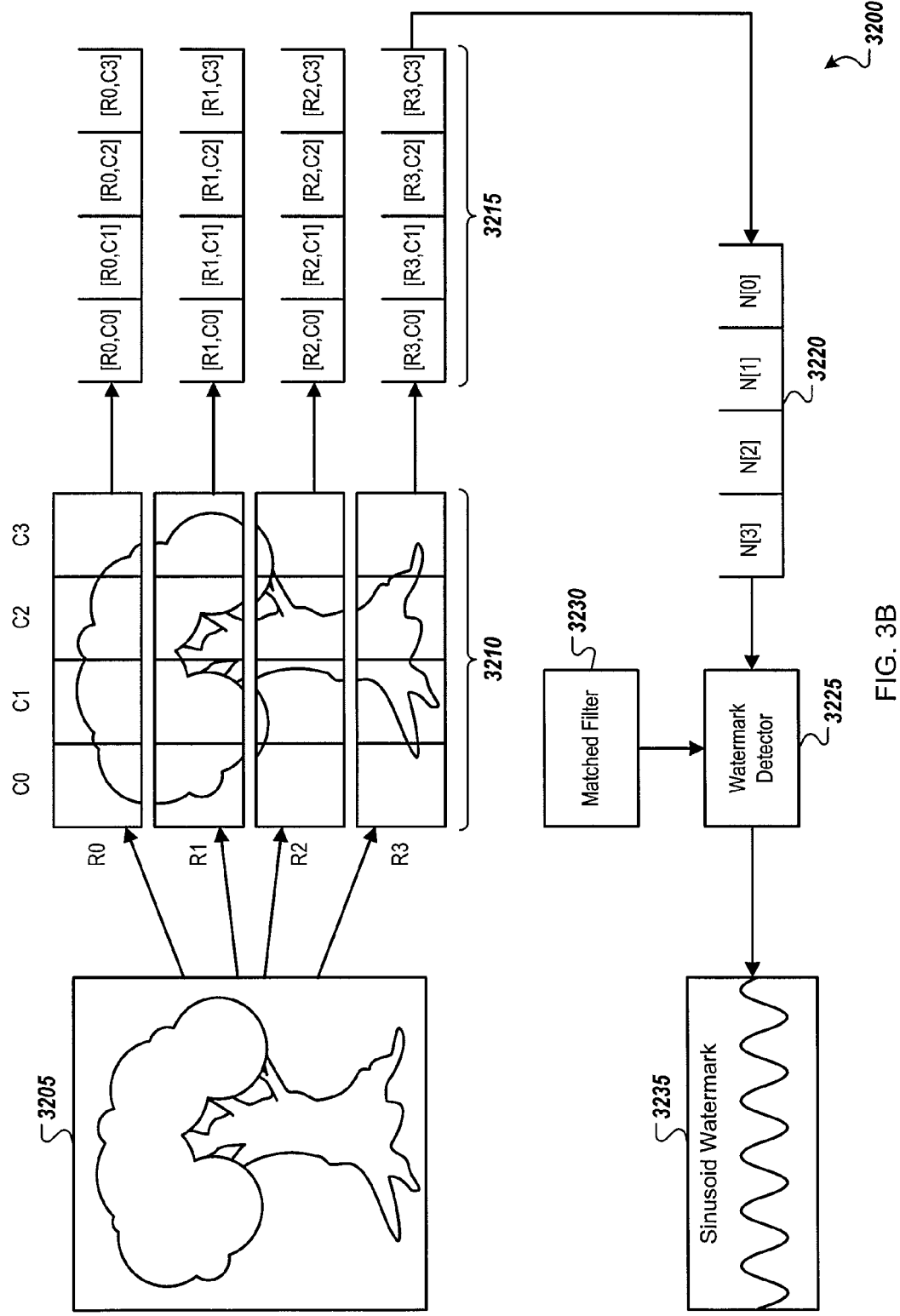
FIG. 3B is a block diagram showing another example process of detecting a watermark in video data.

FIG. 3B is a block diagram showing an example process (3200) of detecting a one dimensional watermark (3235) in a frame (3205) of a video. In some implementations, the frame (3205) can be separated by one or more scan lines (3210). The scan lines (3210) can be divided into rows and columns, such as described above in connection with FIG. 2B.

The scan lines (3210) can be treated as a two dimensional array (3215). The two dimensional array (3215) can be combined into a one dimensional array (3220). The one dimensional array (3220) can be examined by a watermark detector (3225) using a matched filter (3230) to determine if the sinusoid watermark (3235) is present in the frame (3205). Note that unlike a traditional two dimensional linear filter, the matched filter (3230) need not employ a number of multiply-add operations on the order of R×C×N to calculate the matched filter response for an entire image, where R is the number of rows in the image, C is the number of columns in the image, and N is the number of points in the impulse response of the matched filter. This is because the pattern of the present watermark is one dimensional, rather than two dimensional. Thus, detection can be performed by first summing over all the columns to produce an array of C numbers, and then the amount of computation used to detect the watermark can be reduced to C×(R+N), which is typically much smaller than R×C×N.

Figure 3C:
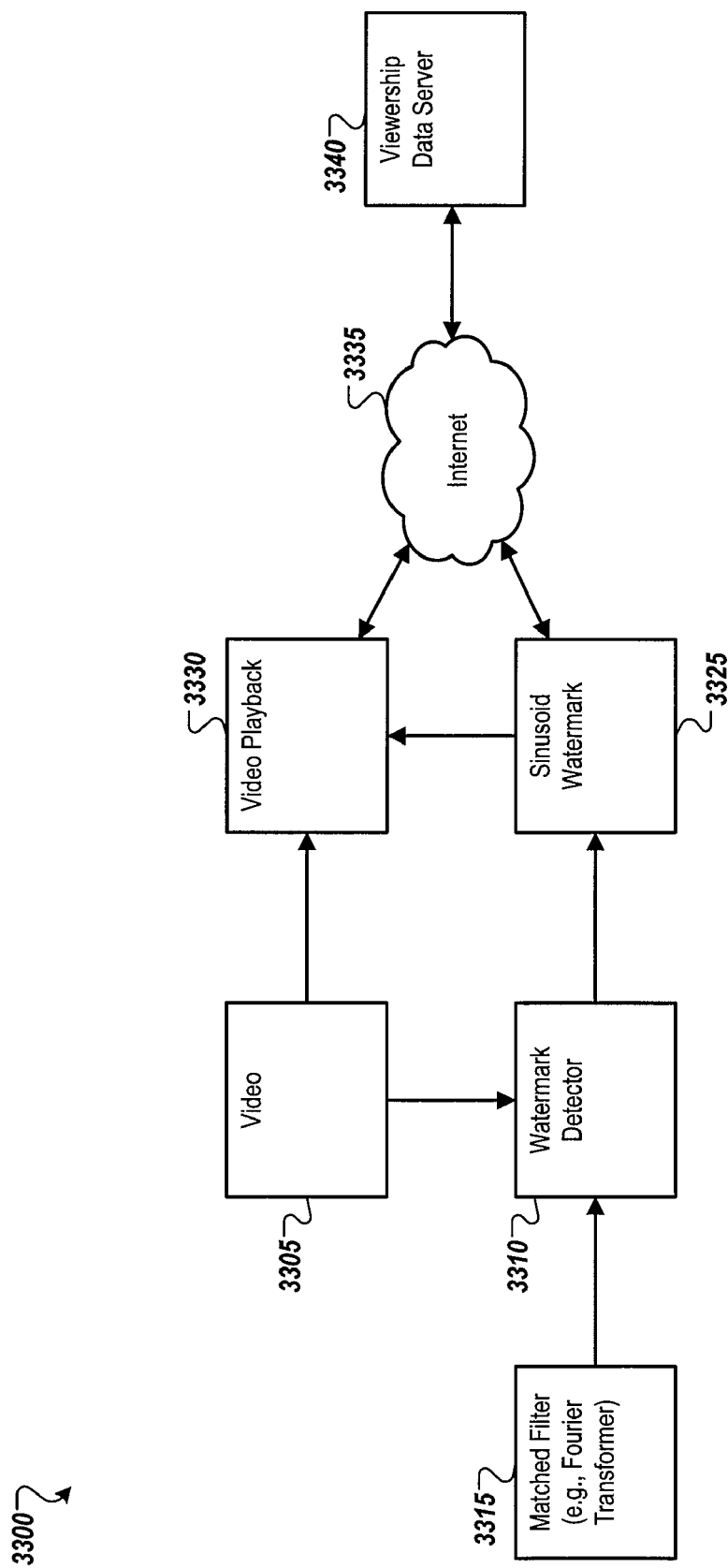
FIG. 3C is a block diagram showing an example video analysis system used to view a video.

FIG. 3C is a block diagram showing an example video analysis system (3300) used to view a video (3305). In some implementations, the video (3305) can be examined to determine if it contains a sinusoid watermark (3325). A watermark detector (3310) can analyze the video (3305) using a matched filter (3315). In some implementations, the matched filter (3315) can include a Fourier transformer or an element capable of performing a Fourier transformation. Note that employing a Fourier transform to detect a sinusoid watermark can provide significant advantages when dealing with video image that have been cropped since the Fourier transform can still identify the sinusoid even if the peak of the sinusoid isn't in the expected place, without requiring a trial and error approach to watermark detection. Moreover, the Fourier transform can provide significant speed advantages in watermark detection.

The presence of the sinusoid watermark (3325) can be detected by the watermark detector (3310). The watermark (3325) can be passed to a video playback system (3330). Video playback system (3330) can record the watermark (3325) and communicate with a viewership data server (3340) over the Internet (3335) to report viewership statistic information.

In some implementations, some or all of the components in the system (3300) can be computer software components such as programs, daemons, services, or data files. In some implementations, some or all of the components in the system (3300) can be computer hardware components such as hard disks, network cables, applications-specific integrated circuits or general purpose microprocessors. Moreover, the components in the system (3300) need not be separated as shown; for example, the matched filter (3315) can be integrated into the watermark detector (3310), which can be integrated into the video playback system (3330).

Figure 3D:
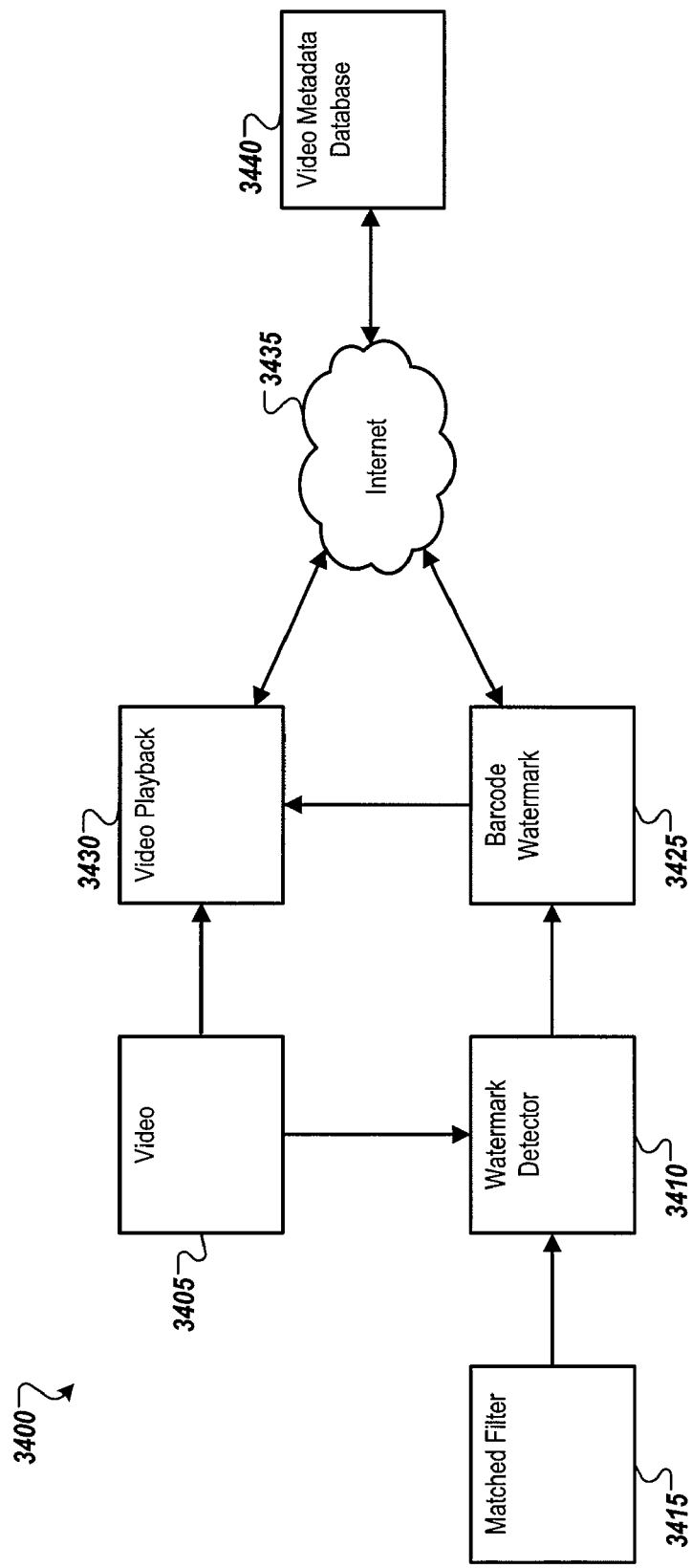
FIG. 3D is a block diagram showing another example video analysis system used to view a video.

FIG. 3D is a block diagram showing an example video analysis system (3400) used to view a video (3405) that can have associated metadata. In some implementations, the video (3405) can be examined to determine if it contains a barcode-type watermark (3425). A watermark detector (3410) can analyze the video (3405) using a matched filter (3415). The presence of the barcode-type watermark (3425) can be detected by the watermark detector (3410). The barcode-type watermark (3425) can be passed to a video playback (3430) system. The video playback (3430) can perform further processing on video (3405).

The video playback (3430) can communicate with a video metadata database (3440) over the Internet (3435) and use the barcode-type watermark (3425) to look up any metadata associated with the video. The metadata can then be displayed with the video (3405) by the video playback (3430).

In some implementations, some or all of the components in the system (3400) can be computer software components such as programs, daemons, services, or data files. In some implementations, some or all of the components in the system (3400) can be computer hardware components such as hard disks, network cables, applications-specific integrated circuits or general purpose microprocessors. Moreover, the components in the system (3400) need not be separated as shown; for example, the matched filter (3415) can be integrated into the watermark detector (3410), which can be integrated into the video playback system (3430).

Figure 4:
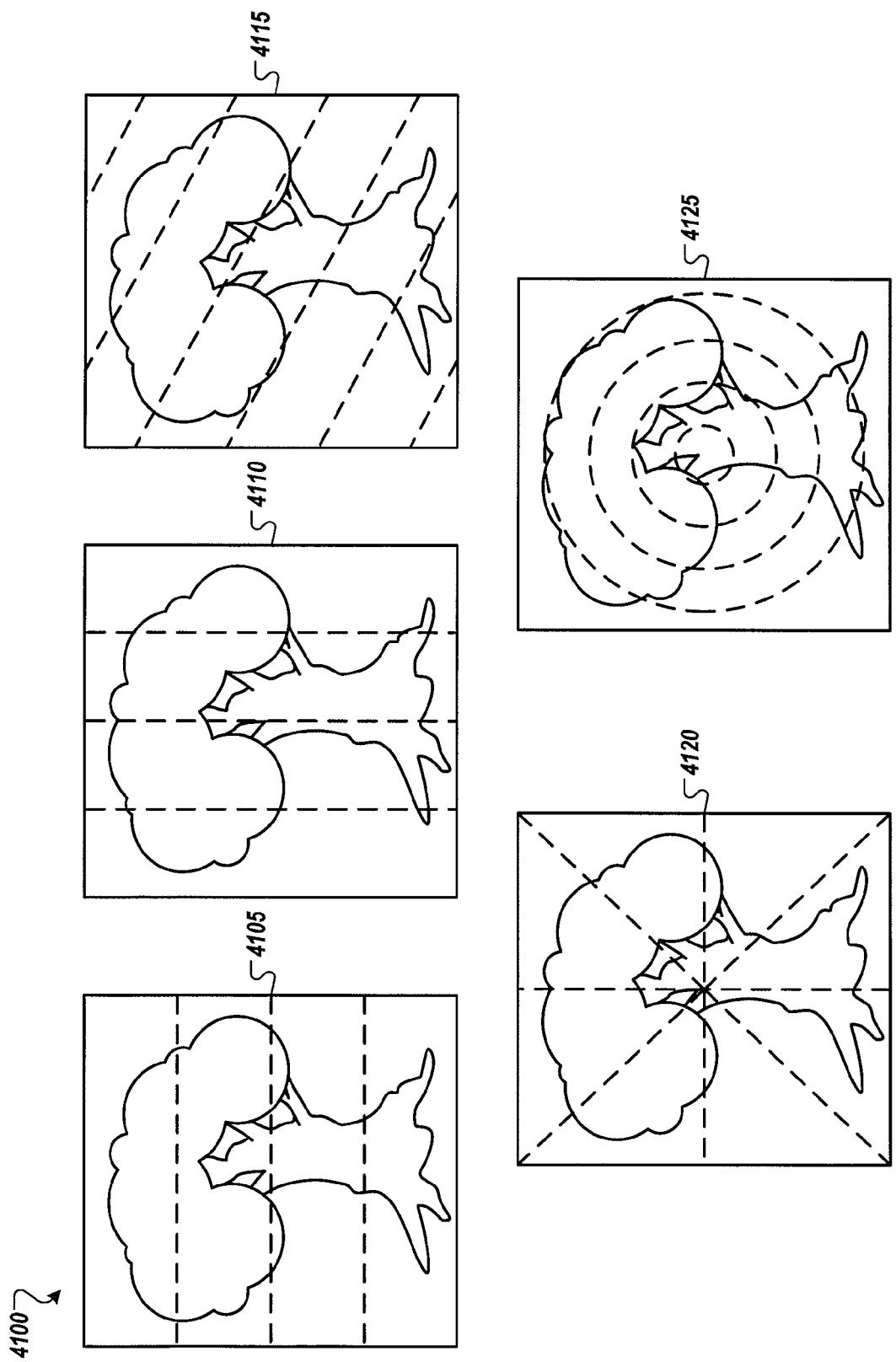
FIG. 4 is a list of video frames showing examples of different one dimensional data lines within each frame.

FIG. 4 is a list of video frames showing examples of different one dimensional data lines within each frame. A single frame of a video can be divided in multiple ways (4100) to identify one dimensional data lines for watermark encoding. In some implementations, horizontal data lines (4105) can be used to encode a watermark. In some implementations, vertical data lines (4110) can be used to encode a watermark. In some implementations, diagonal data lines (4115) can be used to encode a watermark. In some implementations, radial data lines (4120) can be used to encode a watermark. In some implementations, concentrically circular data lines (4125) can be used to encode a watermark. Note that the radial data lines (4120) and concentrically circular data lines (4125) implementations can facilitate the use of these techniques with video data that may be rotated. Moreover, more than one of these different types of data lines can be used within the same video, including within the same frame of the video.

It should be noted that the data lines are one dimensional in that each encoding of a watermark is spread across only a single dimension within a video frame, rather than across the entire two dimensional surface of the video frame. This is true even if that single dimension is curved within the two dimensional space, as is the case with the concentrically circular data lines (4125).

Figure 5:
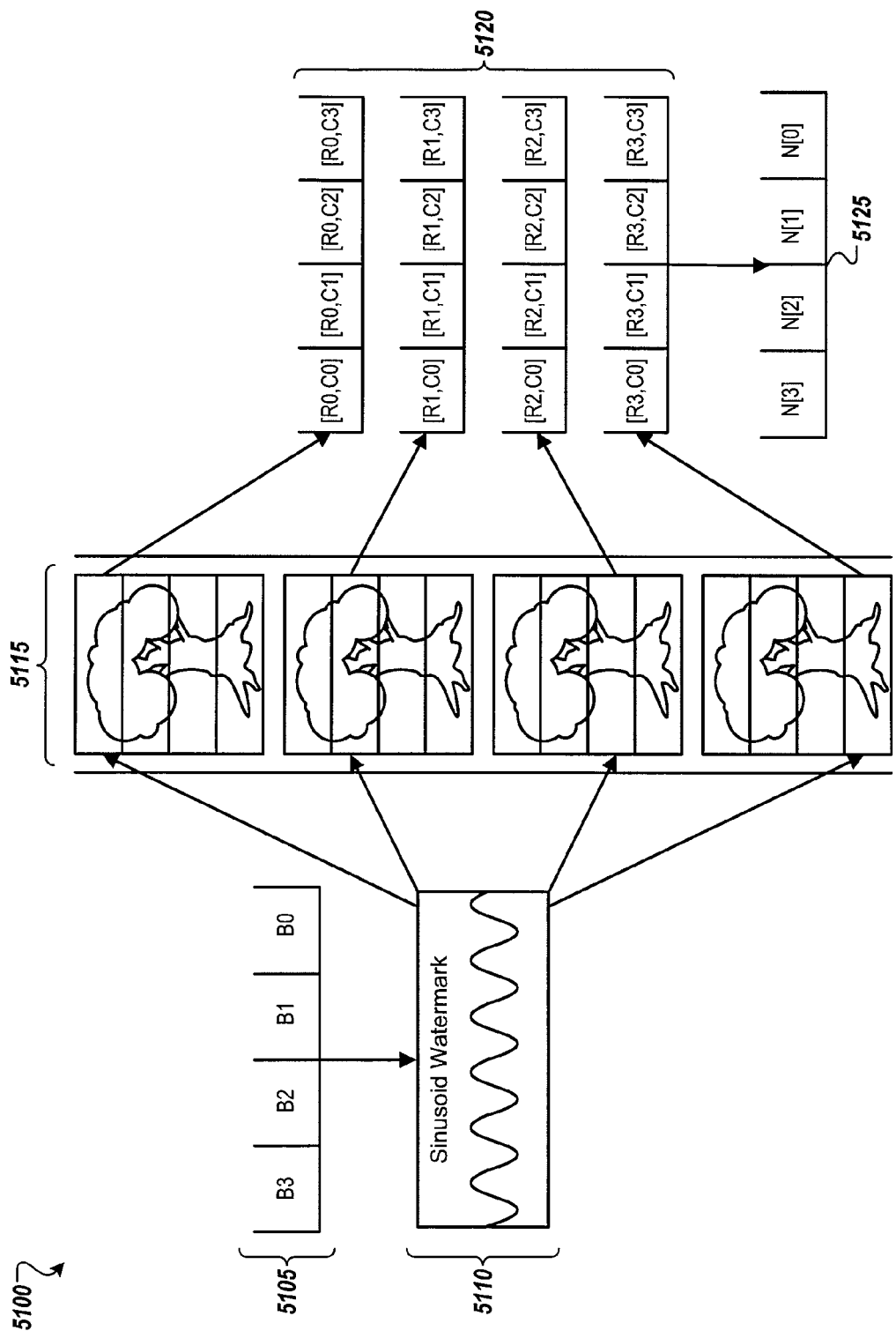
FIG. 5 is a block diagram showing an example process of embedding and detecting a watermark in different scan lines of different frames in a video.

FIG. 5 is a block diagram showing an example process (5100) of embedding and detecting a watermark in different scan lines of different frames in a video. A watermarking system can embed the same watermark on one dimensional data lines in different frames of a video (5115). Thus, the same one dimensional watermark pattern can be applied to scan lines that span multiple frames. In some implementations, one or more bits of data (5105) can be used to create a sinusoid watermark (5110). The sinusoid watermark (5110) can be embedded into different one dimensional data lines of different frames of the video (5115).

When examining different frames of the video (5115), a two dimensional array (5120) can be constructed using different one dimensional data lines of different frames of the video (5115). The two dimensional array (5120) can be combined into a one dimensional array (5125), which can be examined to determine if a watermark is present in the video. Moreover, multiple different sinusoid watermarks (5110) can be applied to the video (5115) within a given frame, to different frames, or both.

In some implementations, a watermark can be embedded into a portion of the video frame image. A video frame can be divided into quadrants or different regions, and each quadrant or region can have a different watermark applied therein. Various tiles (e.g., hexagonal tiles), or vertical, horizontal, and/or diagonal stripes can be used. Moreover, in some implementations, the regions to be watermarked can be selected based on the image, including an analysis of what portions of the image constitute good places to hide the watermark(s), such as described in further detail above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions tangibly encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data, regardless of the underlying physical structures used to implement the processor and memory device(s) (e.g., biological, photonic (light-switching) or quantum based computer technologies may also be used). Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the systems and techniques described herein can be employed with still images rather than with video data.

The systems and techniques described herein can be employed in other implementations and workflows. For instance, digital camera manufacturers may decide to have their cameras incorporate, either by software or hardware means, a watermark directly in the camera. For commercial broadcasting, final encoding is done just before "play-out" onto the cable or satellite network; sometimes these encoding devices are computers, and sometimes they are special purpose pieces of hardware. In any case, one convenient place to insert a watermark would be at the play-out time. Similarly, a cable operator may choose to watermark the video that it distributes, so the watermark can be inserted at the "cable head", as well.

What is claimed is:

1. A computer-implemented method comprising:
receiving video data comprising frames;
varying a watermark pattern in accordance with a function of frame numbers of the frames of the video data to create multiple variations of the watermark pattern;
applying the variations of the watermark pattern to the video data in respective frames; and
outputting the watermarked video data;
wherein the varying comprises varying the watermark pattern in accordance with a square wave function, and the square wave function has a first amplitude corresponding to even numbered frames and a second amplitude corresponding to odd numbered frames.

2. The method of claim 1, wherein the outputting comprises storing the watermarked video data to a tangible medium for subsequent detection of the watermark pattern.

3. The method of claim 1, wherein the varying comprises varying the watermark pattern in accordance with a multipart function having a first part used for a first set of frames and a second part used for a second set of frames, the method further comprising selecting which of the first and second function parts to use for a given set of frames based on an analysis of video data within the given set of frames.

4. The method of claim 1, wherein the varying comprises producing each variation of the watermark pattern from a gain factor and a perceptual weighting applied to the watermark pattern, with the gain factor being governed by the function.

5. A computer-implemented method comprising:
receiving video data comprising multiple frames;
combining video data from different frames to create combined data in which a watermark pattern is enhanced, the watermark pattern being represented in the video data by multiple variations of the watermark pattern, the variations of the watermark pattern having been varied in accordance with a function of frame numbers of the frames;
analyzing the combined data to detect the watermark pattern; and outputting an indication of a match, to trigger further processing with respect to the video data, when the analyzing indicates the watermark pattern has been detected;

wherein the watermark pattern comprises a one dimensional watermark pattern, each of the variations of the watermark pattern has been applied to multiple one dimensional data lines in at least one of the frames, and the combining comprises adding the multiple one dimensional data lines together for each of the variations of the watermark pattern to create respective one dimensional arrays of numbers, and subtracting one of the arrays from another of the arrays.

6. The method of claim 5, wherein the combining comprises subtracting video data found in one of the frames from video data found in another one of the frames.

7. The method of claim 5, wherein the variations of the watermark pattern are varied in accordance with a sinusoidal function comprising a temporal frequency, and the combining comprises multiplying video data found in the frames by sine and cosine of the temporal frequency.

8. A non-transitory computer-readable medium tangibly encoding a computer program product operable to cause data processing apparatus to perform operations comprising:
receiving video data comprising frames;
varying a watermark pattern in accordance with a function of frame numbers of the frames of the video data to create multiple variations of the watermark pattern;
applying the variations of the watermark pattern to the video data in respective frames; and
outputting the watermarked video data;
wherein the varying comprises varying the watermark pattern in accordance with a square wave function, and the square wave function has a first amplitude corresponding to even numbered frames and a second amplitude corresponding to odd numbered frames.

9. The computer-readable medium of claim 8, wherein the outputting comprises storing the watermarked video data to a tangible medium for subsequent detection of the watermark pattern.

10. The computer-readable medium of claim 8, wherein the varying comprises varying the watermark pattern in accordance with a multipart function having a first part used for a first set of frames and a second part used for a second set of frames, the operations further comprising selecting which of the first and second function parts to use for a given set of frames based on an analysis of video data within the given set of frames.

11. The computer-readable medium of claim 8, wherein the varying comprises producing each variation of the watermark pattern from a gain factor and a perceptual weighting applied to the watermark pattern, with the gain factor being governed by the function.

12. A non-transitory computer-readable medium tangibly encoding a computer program product operable to cause data processing apparatus to perform operations comprising:
receiving video data comprising multiple frames;
combining video data from different frames to create combined data in which a watermark pattern is enhanced, the watermark pattern being represented in the video data by multiple variations of the watermark pattern, the variations of the watermark pattern having been varied in accordance with a function of frame numbers of the frames;
analyzing the combined data to detect the watermark pattern; and
outputting an indication of a match, to trigger further processing with respect to the video data, when the analyzing indicates the watermark pattern has been detected;

wherein the watermark pattern comprises a one dimensional watermark pattern, each of the variations of the watermark pattern has been applied to multiple one dimensional data lines in at least one of the frames, and the combining comprises adding the multiple one dimensional data lines together for each of the variations of the watermark pattern to create respective one dimensional arrays of numbers, and subtracting one of the arrays from another of the arrays.

13. The computer-readable medium of claim 12, wherein the combining comprises subtracting video data found in one of the frames from video data found in another one of the frames.

14. The computer-readable medium of claim 12, wherein the variations of the watermark pattern are varied in accordance with a sinusoidal function comprising a temporal frequency, and the combining comprises multiplying video data found in the frames by sine and cosine of the temporal frequency.

15. A system comprising:
a user interface device; and
one or more computers operable to interact with the user interface device and to perform operations comprising:
receiving video data comprising frames;
varying a watermark pattern in accordance with a function of frame numbers of the frames of the video data to create multiple variations of the watermark pattern;
applying the variations of the watermark pattern to the video data in respective frames; and
outputting the watermarked video data;
wherein the varying comprises varying the watermark pattern in accordance with a square wave function, and the square wave function has a first amplitude corresponding to even numbered frames and a second amplitude corresponding to odd numbered frames.

16. The system of claim 15, wherein the outputting comprises storing the watermarked video data to a tangible medium for subsequent detection of the watermark pattern.

17. The system of claim 15, wherein the one or more computers comprise a client computing system, including the user interface device, and a server computing system operable to interact with the client computing system through a data communication network.

18. The system of claim 15, wherein the varying comprises varying the watermark pattern in accordance with a multipart function having a first part used for a first set of frames and a second part used for a second set of frames, the operations further comprising selecting which of the first and second function parts to use for a given set of frames based on an analysis of video data within the given set of frames.

19. The system of claim 15, wherein the varying comprises producing each variation of the watermark pattern from a gain factor and a perceptual weighting applied to the watermark pattern, with the gain factor being governed by the function.

20. A system comprising:
a user interface device; and
one or more computers operable to interact with the user interface device and to perform operations comprising:
receiving video data comprising multiple frames;
combining video data from different frames to create combined data in which a watermark pattern is enhanced, the watermark pattern being represented in the video data by multiple variations of the watermark pattern, the variations of the watermark pattern having been varied in accordance with a function of frame numbers of the frames;

analyzing the combined data to detect the watermark pattern; and outputting an indication of a match, to trigger further processing with respect to the video data, when the analyzing indicates the watermark pattern has been detected;

wherein the watermark pattern comprises a one dimensional watermark pattern, each of the variations of the watermark pattern has been applied to multiple one dimensional data lines in at least one of the frames, and the combining comprises adding the multiple one dimensional data lines together for each of the variations of the watermark pattern to create respective one dimensional arrays of numbers, and subtracting one of the arrays from another of the arrays.

21. The system of claim 20, wherein the one or more computers comprise a client computing system, including the user interface device, and a server computing system operable to interact with the client computing system through a data communication network.

22. The system of claim 20, wherein the combining comprises subtracting video data found in one of the frames from video data found in another one of the frames.

23. The system of claim 20, wherein the variations of the watermark pattern are varied in accordance with a sinusoidal function comprising a temporal frequency, and the combining comprises multiplying video data found in the frames by sine and cosine of the temporal frequency.

* * * * *